United States Patent [19]
De Man

[11] Patent Number: 5,278,749
[45] Date of Patent: Jan. 11, 1994

[54] SPRINKLER FLOW CONTROL METHOD AND APPARATUS

[76] Inventor: Heiko De Man, 241 Montair Dr., Danville, Calif. 94526

[21] Appl. No.: 939,537

[22] Filed: Sep. 2, 1992

Related U.S. Application Data

[63] Continuation of Ser. No. 460,427, Jan. 3, 1990, abandoned.

[51] Int. Cl.$^5$ .................. G05B 11/01; E03B 1/00
[52] U.S. Cl. ..................... 364/143; 364/145; 137/624.13; 239/69; 239/70
[58] Field of Search ........... 137/624.18, 624.2, 624.14, 137/218, 557, 597, 884, 885, 240; 364/143, 145; 239/69, 70, 11, 727, 729

[56] References Cited

U.S. PATENT DOCUMENTS

| | | |
|---|---|---|
| Re. 31,204 | 4/1983 | Sanner . |
| 132,604 | 10/1872 | Smith et al. . |
| 327,877 | 10/1885 | Hodges . |
| 1,054,812 | 3/1913 | Zierath . |
| 1,125,642 | 1/1915 | Blanchard . |
| 1,347,660 | 7/1920 | Reiband . |
| 1,605,507 | 11/1926 | Burke . |
| 1,880,098 | 9/1932 | Mair . |
| 2,386,589 | 10/1945 | Caldwell . |
| 2,447,947 | 8/1948 | Larson et al. . |
| 2,453,849 | 11/1948 | Merriam . |
| 2,503,469 | 4/1950 | Caldwell . |
| 2,581,047 | 1/1952 | Salmond . |
| 2,638,121 | 5/1953 | Dillman . |
| 2,643,677 | 6/1953 | MacLean . |
| 3,096,787 | 7/1963 | Kayler ............... 137/624.18 X |
| 3,139,111 | 6/1964 | Schneider ............ 137/624.18 |
| 3,286,733 | 11/1966 | Hunter ............... 137/124.2 |
| 3,319,655 | 5/1967 | Palmer ............... 137/624.18 |
| 3,372,708 | 3/1968 | Hotchkin ............ 137/624.2 |
| 3,386,460 | 6/1968 | Dean ............... 137/624.18 X |
| 3,574,336 | 4/1971 | Epple . |
| 3,599,669 | 8/1971 | Polzer . |
| 3,664,550 | 5/1972 | Carothers . |
| 3,803,491 | 4/1974 | Osborn . |
| 3,823,874 | 7/1974 | Kroeck . |
| 3,827,459 | 8/1974 | Hunter . |
| 3,850,078 | 11/1974 | Polizzi . |
| 3,972,344 | 8/1976 | Chauvigné . |
| 4,004,612 | 1/1977 | Hummel, Jr. et al. ............ 239/69 |
| 4,012,673 | 3/1977 | Saarem et al. . |
| 4,014,359 | 3/1977 | Sanner ............... 137/78 |
| 4,061,893 | 12/1977 | Sanner . |
| 4,097,763 | 6/1978 | Saarem . |
| 4,131,133 | 12/1978 | Huwe . |
| 4,150,685 | 4/1979 | Van Haaften . |
| 4,161,292 | 7/1979 | Holloway et al. ............. 239/11 |
| 4,175,579 | 11/1979 | Richard ............. 137/624.2 X |
| 4,190,884 | 2/1980 | Medina . |
| 4,232,707 | 11/1980 | Sturman et al. . |
| 4,244,022 | 6/1981 | Kendall . |
| 4,253,606 | 3/1981 | Johnson . |
| 4,265,403 | 5/1981 | Bonetti . |
| 4,351,279 | 9/1982 | Wick . |
| 4,352,463 | 10/1982 | Baker . |
| 4,522,338 | 6/1985 | Williams ............. 239/729 |
| 4,575,004 | 3/1986 | Geiger . |
| 4,575,006 | 3/1986 | Madden . |
| 4,592,505 | 6/1986 | Bruniga et al. . |
| 4,646,224 | 2/1987 | Ransburg et al. ............. 364/143 |
| 4,660,775 | 4/1987 | Ostrom et al. ............. 239/727 |
| 4,729,514 | 3/1988 | Ostrom et al. ............. 239/727 |
| 4,838,310 | 6/1989 | Scott ............... 137/624.14 |
| 4,848,722 | 7/1989 | Webster ............. 137/884 |
| 4,852,851 | 8/1989 | Webster ............. 137/597 |
| 4,858,883 | 8/1989 | Webster ............. 137/885 |
| 4,867,192 | 9/1989 | Terrell et al. ............. 239/69 |
| 4,991,655 | 2/1991 | McHugh ............. 137/557 |
| 5,203,368 | 4/1993 | Barstow et al. ............. 137/240 |

Primary Examiner—Jerry Smith
Assistant Examiner—Jim Trammell
Attorney, Agent, or Firm—Townsend and Townsend

[57] ABSTRACT

A device for distributing pressurized water to a plurality of sprinkler lines is provided. The valve and valve control portions are centralized, and thus no electrical connection to remote locations is required. The valve system is modular so as to permit addition or deletion of modules for adding or removing control of sprinkler lines. A stepper motor and cam shaft system permits expenditure of energy only during change-of-state events, so that no electrical energy need be consumed to maintain a watering state. A generator which produces electrical energy from the pressure head of a pressurized water source provides electrical energy for operating a motor and a motor controller, such as a device including a microprocessor.

44 Claims, 13 Drawing Sheets

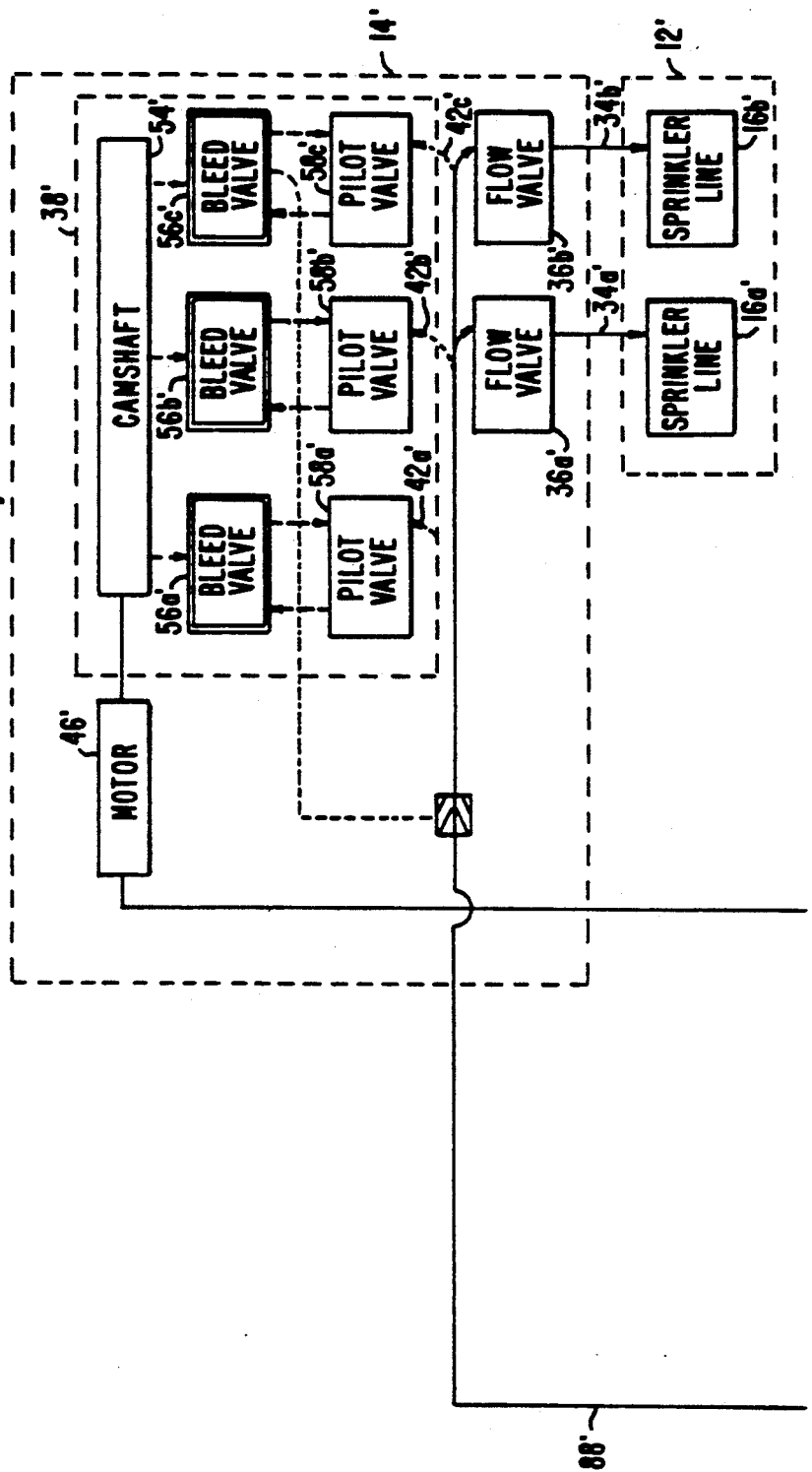

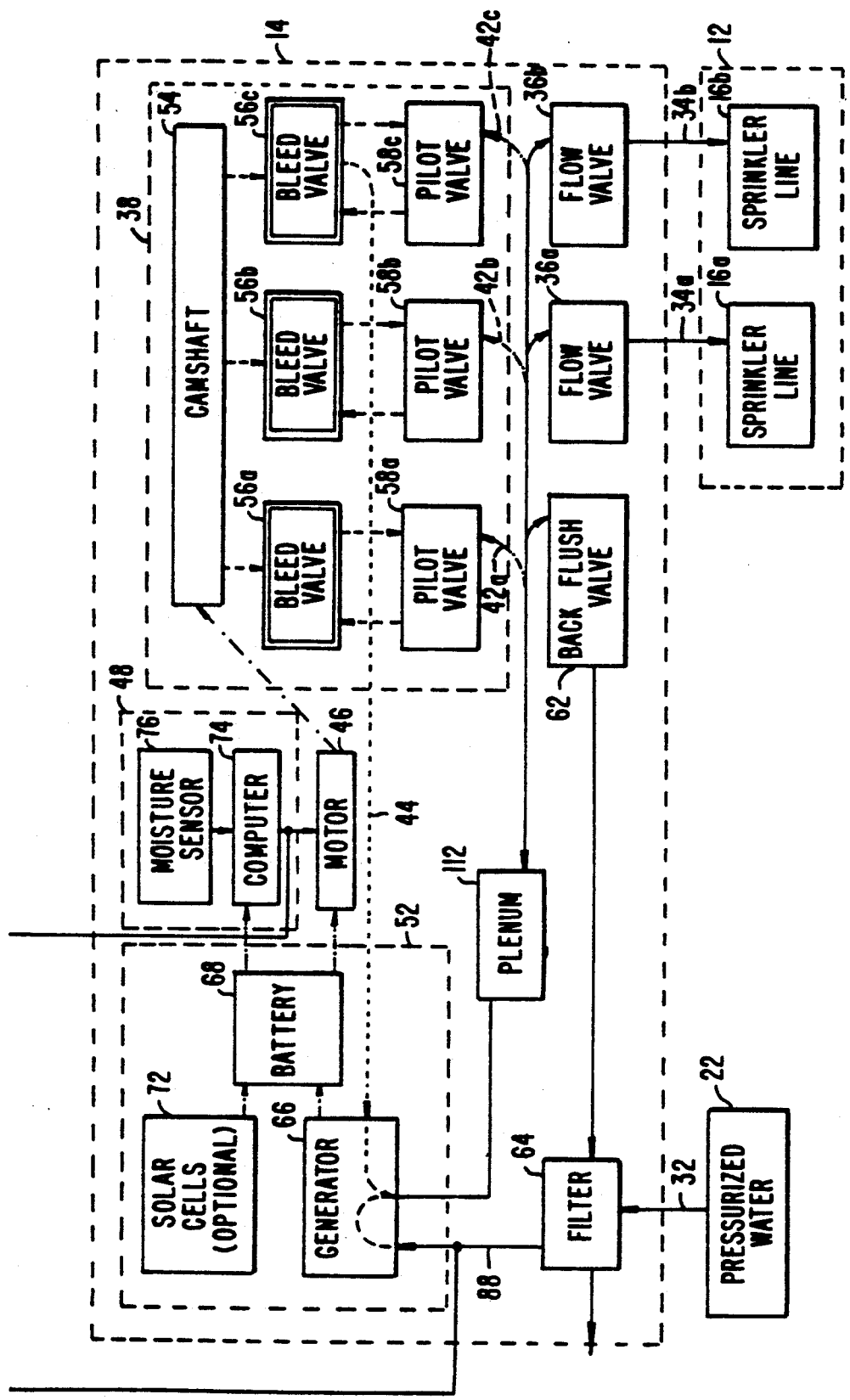
FIG. 3A₂

SPRINKLER FLOW CONTROL METHOD AND APPARATUS

This is a continuation of application Ser. No. 07/460,427 filed Jan. 3, 1990, now abandoned.

FIELD OF THE INVENTION

The present invention is related to the control of water flow to sprinkler and sprinkler lines and, in particular, to a centralized flow control apparatus and method without remote electrical lines.

BACKGROUND OF THE INVENTION

A number of systems are used for controlling water flow to remotely-positioned sprinklers or sprinkler lines, e.g., for watering lawns, golf courses, agricultural fields, and the like. In typical previous systems, a timer device was provided to output electrical signals at predetermined times. These electrical signals were routed through cables to solenoid-controlled valves positioned in the remote locations. Each solenoid-controlled valve connected a water supply line to one or more sprinklers or sprinkler lines. When the electrical signal activated a solenoid-controlled valve, the valve opened to connect the pressurized water source to the sprinkler or sprinkler line.

Typically, the power needed to open and/or hold open a solenoid valve was provided through the cable originating in the timer device. The large amount of power needed to open or hold open the solenoid-controlled valve typically required that the timer device have a source of medium to high voltage electrical power, such as a 24 volt supply, which may be stepped-down from a 110 volt AC (household) power source. Typically, the timer could be configured to operate the various solenoid valves at different preselected times.

SUMMARY OF THE INVENTION

The present invention includes the recognition of various problems and difficulties of previous devices. Many previous devices required that each remote sprinkler location or sprinkler line be connected to both a source of water and the centralized timer by, for example, an electrical cable or wire. Providing an electrical path to the remote locations, in addition to the water line, is an expensive procedure, particularly because it is usually necessary to protect the electrical cable from hazards, such as rodents or other burrowing animals and standing water typically present during sprinkling.

Because the remote locations include electrical components and valves, the cost of remote maintenance is high, compared to maintenance costs for simple plumbing connections.

When control functions are allocated to each sprinkler or sprinkler line, the components used in the remote locations, such as valves and valve controllers, are relatively expensive. The high cost of solenoid-controlled valves often results in a single solenoid-controlled valve being used to control a large number of sprinklers. For example, a single solenoid valve may be used to control three sprinkler lines, which also will require a relatively expensive three-way manifold for the water supply line. Using a single solenoid-controlled valve to control a large number of sprinklers leads to several undesirable results. As the number of sprinklers which are on at any one time is increased, the water pressure available to each sprinkler is lessened, which can lead to under-watering when the pressure of the water supply line is low. Further, because sprinklers controlled by a single valve are likely to be adjacent, certain regions can become quickly saturated so that continued sprinkling results in water run-off and waste.

Because of the large power consumption of previous systems, such systems are typically dependent on the availability of a source of household electrical current. For this reason, sprinkler-control installations in areas such as freeway medians or shoulders and golf courses are expensive because electrical power wiring must be provided to the central timer device. Additionally, power outages in the voltage supply lines can disrupt the planned watering schedules.

The present invention includes a centralized control system in which all of the timing, control, and valving occur in a central location. In this way, the only necessary connection from the central location to the remote stations is a water line; no electrical wiring or cable need be provided between the central location and the remote locations.

The present invention also includes independence from external sources of electrical power. In one embodiment, the pressure head from the pressurized water line is used in operating the valves and/or timing devices. In this way, sprinkler-controlled systems can be provided in locations where it is expensive or impractical to string electrical power lines.

The embodiment of the present invention which employs the pressure head of the pressurized water source also includes providing for a control and valving system which consumes little power, so that the pressure drop resulting from power generation still leaves sufficient water pressure to provide the desired sprinkling. Power consumption is reduced by eliminating solenoid-controlled valves and using, instead, pilot valves which are operated, at least in part, directly using the pressure head of the pressurized water source. Power consumption is also reduced by using a valve control mechanism which consumes power only during a change of state, so that it is not necessary to continuously consume power during sprinkling.

Preferably, an electric stepper motor selectably rotates a cam shaft operating bleed valves which control pilot valves which, in turn, control the flow valves. Electrical power for the stepper motor and for a programmable controlling computer is, in one embodiment, generated by a turbine generator from the pressure head of the pressurized water source, and stored in a storage battery. To minimize loss of the pressure head, the flow through the turbine is reduced after the turbine has accelerated to a relatively constant rotational velocity.

The present invention also includes providing a system which is modular in nature, so that additional sprinklers or sprinkler lines can be controlled by merely connecting an additional module to the central control device.

The present invention also includes a union joint for connecting pipes together in which the plane, defined by the joints between the pipes, is not perpendicular to the common axes of the pipes.

BRIEF DESCRIPTION OF THE DRAWINGS

FIGS. 3A1 and 3A2 are schematic block diagrams similar to FIG. 3, but showing alternative embodiments;

DETAILED DESCRIPTION OF THE PREFERRED EMBODIMENTS

The sprinkler-water distribution device of the present invention includes a device which is centralized, i.e., in which the valves and valve control for all of the various sprinkler lines are located in a central location, and in which the only connection needed between the central location and the remote sprinkler lines are the water pipes carrying pressurized water from the central location to the various sprinkler lines. The device of the present invention is independent from external electric power sources, i.e., all electric power needed for operation of the device is generated (e.g., from the pressure head of the pressurized water source and/or solar photovoltage cells).

The device of the present invention is modular, i.e., the number of sprinkler lines controllable by the device can be increased by adding one or more substantially identical modules, each having the valves and control mechanisms necessary for controlling an additional controlled sprinkler line.

Figure 1:
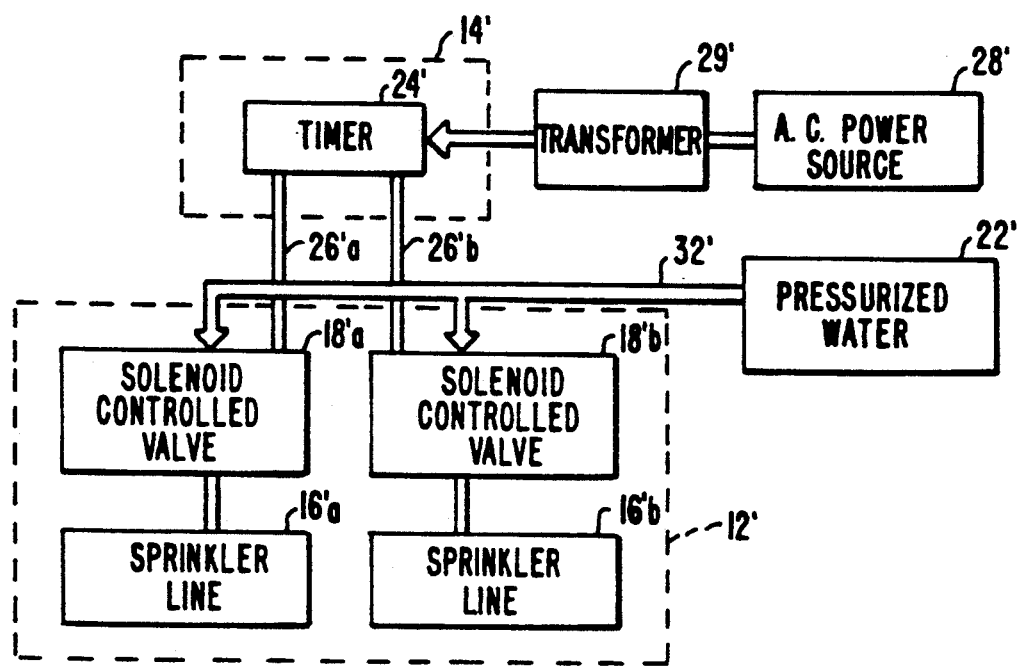
FIG. 1 is a schematic block diagram depicting aspects of previous control systems.

An understanding of the present invention will be assisted by providing a brief description of certain aspects of previously available devices. As depicted in FIG. 1, a typical sprinkler system includes a remote portion 12' and a second portion 14'. The remote portion 12' includes the parts of the system which are located at or adjacent to the area to be sprinkled and, typically, includes the sprinkler lines 16'a, 16'b and solenoid-controlled valves 18'a, 18'b for controlling flow of water from a pressurized water source 22' through the solenoid-controlled valves 18'a, 18'b to the respective sprinkler lines 16'a, 16'b. The timing of the opening and closing of the solenoid valves 18'a, 18'b is controlled by a timer 24', typically an electrical timer, located in the second portion 14' and communicating with the solenoid valves 18'a, 18'b over electric cables 26'a, 26'b. Typically, the amount of power consumed by the solenoid valves 18'a, 18'b, as well as the power consumed by the timer 24', requires a moderate- to high-voltage electric power source, such as a 24 volt source, stepped down from a 110 volt AC household power source 28' by a transformer 29'. The previous devices depicted in FIG. 1 are not centralized because portions of the control mechanism, such as the solenoid valve 18'a, 18'b, are located in the remote portion 12' of the system. It is thus necessary to provide two types of lines to the remote portion 12': a pressurized water line 32' and electric cables or lines 26'a, 26'b Providing both types of lines 32', 26' is an expensive proposition, particularly when the remote site 12' is spread over a large area. The system depicted in FIG. 1 is not modular because providing an additional controlled sprinkler line cannot be accomplished entirely at the second location 14', but must also include providing additional control portions at the remote location 12', viz., an additional solenoid-control valve 18'.

Figure 2:
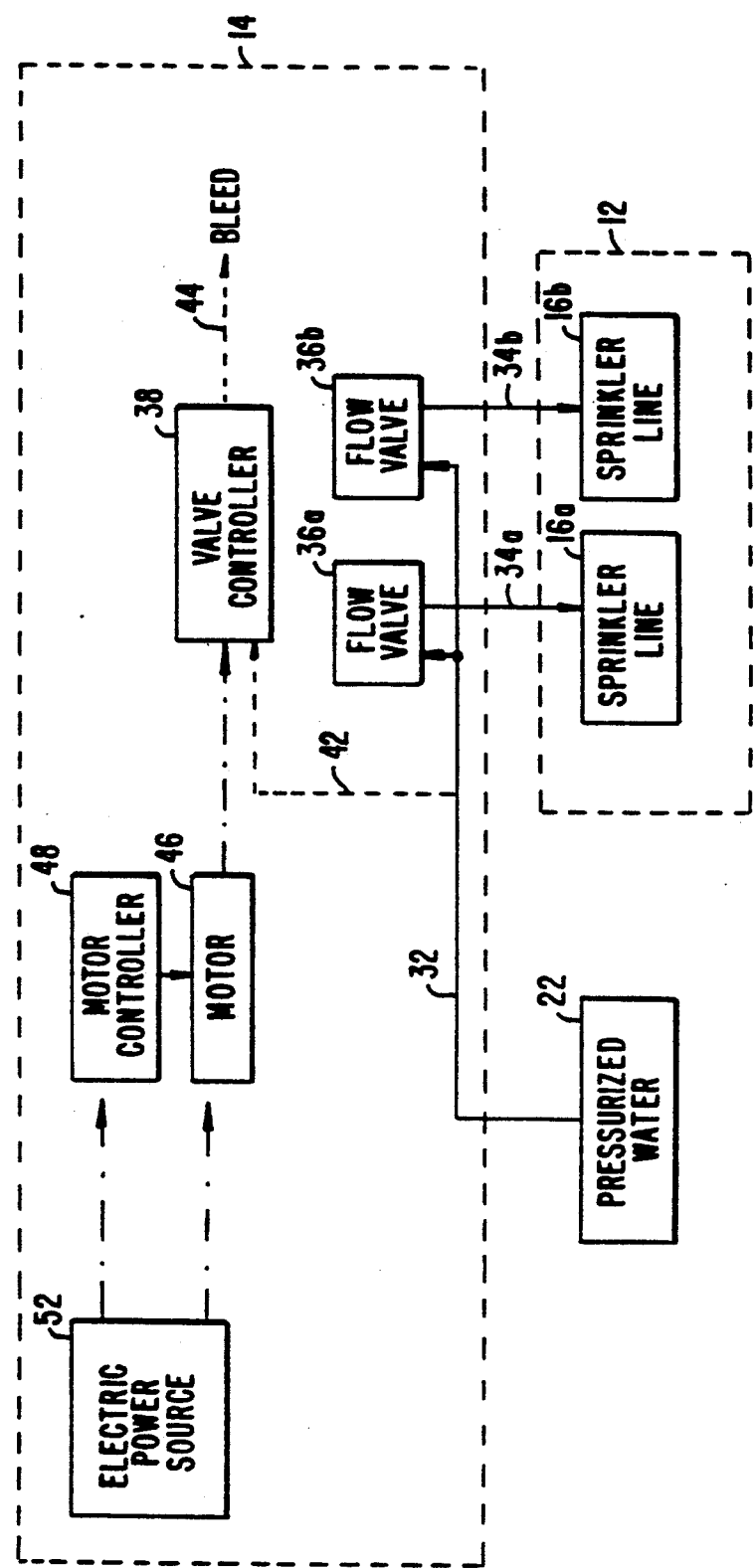
FIG. 2 is a schematic block diagram of a sprinkler-controller system according to the present invention.
Figure 3:
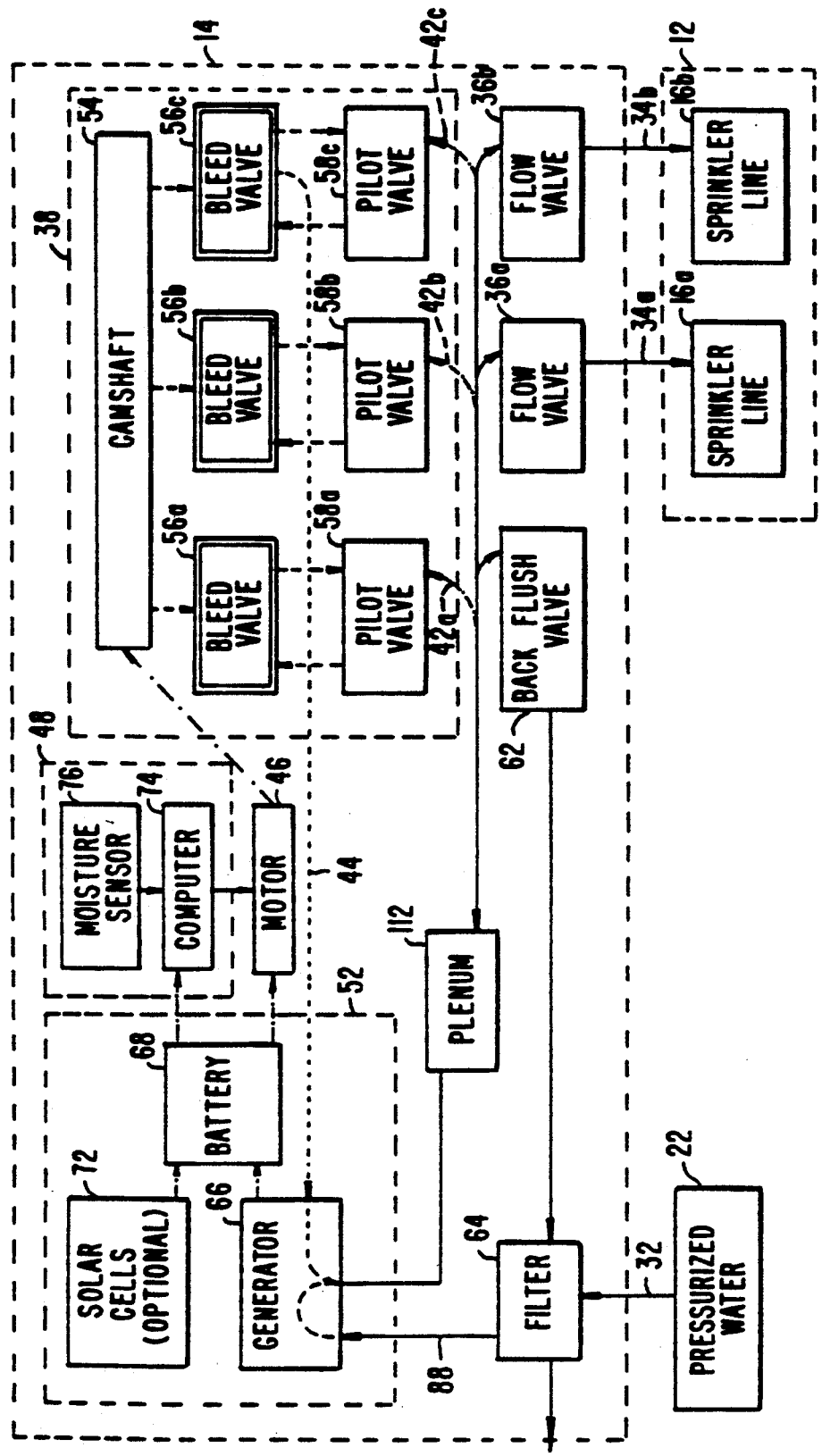
FIG. 3 is a schematic block diagram generally corresponding to FIG. 2, but showing more detailed aspects of one embodiment of the present invention.

FIG. 2 depicts a sprinkler system according to the present invention. As in FIG. 1, the system includes a portion which is located at the remote site 12. In the present case, however, no control devices are present at the remote sites 12. Rather, the remote sites need only include the sprinkler lines themselves, 16a, 16b, and the only connection required between the other portions of the system 14 and the remote site 12 are water lines 34a, 34b. The control section of the system shown in FIG. 2 is entirely located in a central location 14. The flow of water through the water lines 34a, 34b are controlled by flow valves 36a, 36b. The flow valves 36 have a nominal size, typically ¾ inch, 1 inch, or 1¼ inch. The flow of the main portion of pressurized water is depicted in FIG. 2 by solid lines. A pressurized water line 32 provides pressurized water to the flow valves 36a, 36b (preferably by way of a generator, as depicted in FIG. 3 and discussed more fully below). The flow valves, when opened, permit flow of the pressurized water through the respective water lines 34a, 34b to the sprinkler lines 16a, 16b. Opening and closing of the flow valves 36a, 36b is controlled by a valve controller 38, to be more fully described below. In FIGS. 2 and 3, dashed-arrows indicate a control relationship running from the controller device to the controlled device. Preferably, the valve controller 38 includes a hydraulic system, and thus obtains a certain portion of the pressurized water from the pressurized water line 32 by way of a control fluid line 42. Flow of the control fluid is depicted in FIGS. 2 and 3 by dotted-arrows. Control fluid exiting the valve controller 38 is conveyed by a bleed line 44, preferably to be recycled, as described more fully below. Portions of the valve controller 38 are powered by a motor 46. The transmission of power in FIG. 2 is depicted by dash/dot arrows running from the power source to the power consumer. The motor 46 is controlled by a motor controller 48, preferably including a programmable microprocessor, as described more fully below. Both the motor 46 and motor controller 48 receive power from an electric power source 52. In the preferred embodiment, the electric power source 52 is self-contained in the sense that it does not require externally-generated electric power, such as household electric current.

FIG. 3 depicts a preferred embodiment of the present invention in somewhat more detail. As depicted in FIG. 3, the valve controller 38 includes a plurality of components. A cam shaft 54, driven by the motor 46, controls the opening and closing of a plurality of bleed valves 56a, 56b, 56c. The bleed valves 56a, 56b, 56c, in turn, control the operation of pilot valves 58a, 58b, 58c, as described more fully below. At least some of the pilot valves 58b, 58c, in turn, control the flow valves 36a, 36b, as described more fully below. Preferably, one bleed valve 56a and pilot valve 58a control a backflush valve 62 for backflushing a water filter 64, as described more fully below.

Preferably, the main source of power in the electric power source 52 is a generator 66, which generates electric power using the pressure head of the pressurized water 22. Typically, the pressurized water 22 will be ordinary city utility water, usually having a pressure in the range of 40-80 lbs./in.$^2$ (PSI) (about 275 kPa to about 400 kPa). The generator 66 is preferably a fixed-vane impulse turbine generator. The electric power from the generator 66 is preferably stored in an electric power storage device, such as a battery 68. Other sources of electric power can be provided to supplement or replace the generator 66, such as by solar photovoltage cells 72. Power from the electric power source 52 is provided to the motor 46 and the motor controller 48. As depicted in FIG. 3, motor controller 48 preferably includes an electronic computer 74 having a microprocessor (not shown).

In one preferred embodiment, the computer 74 can adjust the activation or timing of the motor 46, depending upon the amount of moisture sensed by a moisture sensor 76. Preferably, the moisture sensor 76 senses moisture from precipitation which is typically related to, and preferably calibrated with, the general amount of ground moisture in the remote region 12 being sprinkled.

The computer 74 is programmable to provide a predetermined watering schedule over an extended period, preferably a period greater than one year. The computer preferably contains or is connected to an electronic calendar and time clock, in a manner well known in the computer art, for providing this feature. In one preferred embodiment, the computer has the capability of being programmed for a period of about 30 years. The predetermined water schedule which is programmed can be programmed in such a way that any two consecutive days in the preprogrammed period can have different watering schedules. Consecutive days can also have identical watering schedules.

Preferably, the computer can be programmed to provide a pulsed watering schedule. A pulsed watering schedule is one in which a given sprinkler is activated for watering for a first, relatively short, period, followed by a period of non-watering, and followed, again, by another relatively short period of watering. As an example, 10 seconds of watering, followed by 50 seconds of non-watering, could be repeated for an extended period, such as up to 200 times or more in 24 hours. Pulsed watering is particularly useful in conserving water. As noted above, previous watering schemes, being limited by power considerations, typically provide activation of a given sprinkler for one extended period. This type of watering often results in surface pooling or flooding and subsequent runoff of the water from the desired area into an adjacent area. The inefficiency of this type of watering scheme is avoided by the pulsed watering scheme made feasible by the present invention.

FIG. 3A depicts an alternative embodiment of the present invention. According to the embodiment depicted in FIG. 3A, the computer 74 is used for controlling two sets of sprinkler lines. Thus, in addition to providing a control signal for controlling the motor 46 of the first non-remote portion 14, the computer 74 also provides signals which are used to control a motor 46' provided in a second non-remote portion 14'. The second non-remote portion 14' includes, in addition to the motor 46', a valve controller 38' similar to the above-described valve controller 38', flow valves 36', similar to the above-described flow valves 36, and water lines 34 for connection to a second set of sprinkler lines 12'. The bleed line 44', which exits the valve controller 38', preferably is conducted to a Venturi device 86' similar to that described below in connection with FIG. 5. A water line 88' provides a source of water to the second non-remote location 14'.

The embodiment depicted in FIG. 3A is useful when, as is commonly the case, the computer 74 has sufficient computing capability to control a larger number of flow valves 36 than is desired to be contained in one non-remote location 14. Thus, when the computer 74 is capable of controlling 32 flow valves, and when each non-remote location 14 contains eight flow valves, the computer 74 can be used in connection with four separate, non-remote locations 14. The configuration depicted in FIG. 3A requires that a signal line extend from the first non-remote location 14 to the second non-remote location 14'. However, the line which carries such a signal is typically a lower-voltage line than the electric lines 26' connecting a non-remote location 14' to a remote location 12' in previous devices. Furthermore, although the signal line connects two non-remote locations 14, 14', there is no need for a signal line extending to any of the remote locations 12, 12'.

Figure 4:
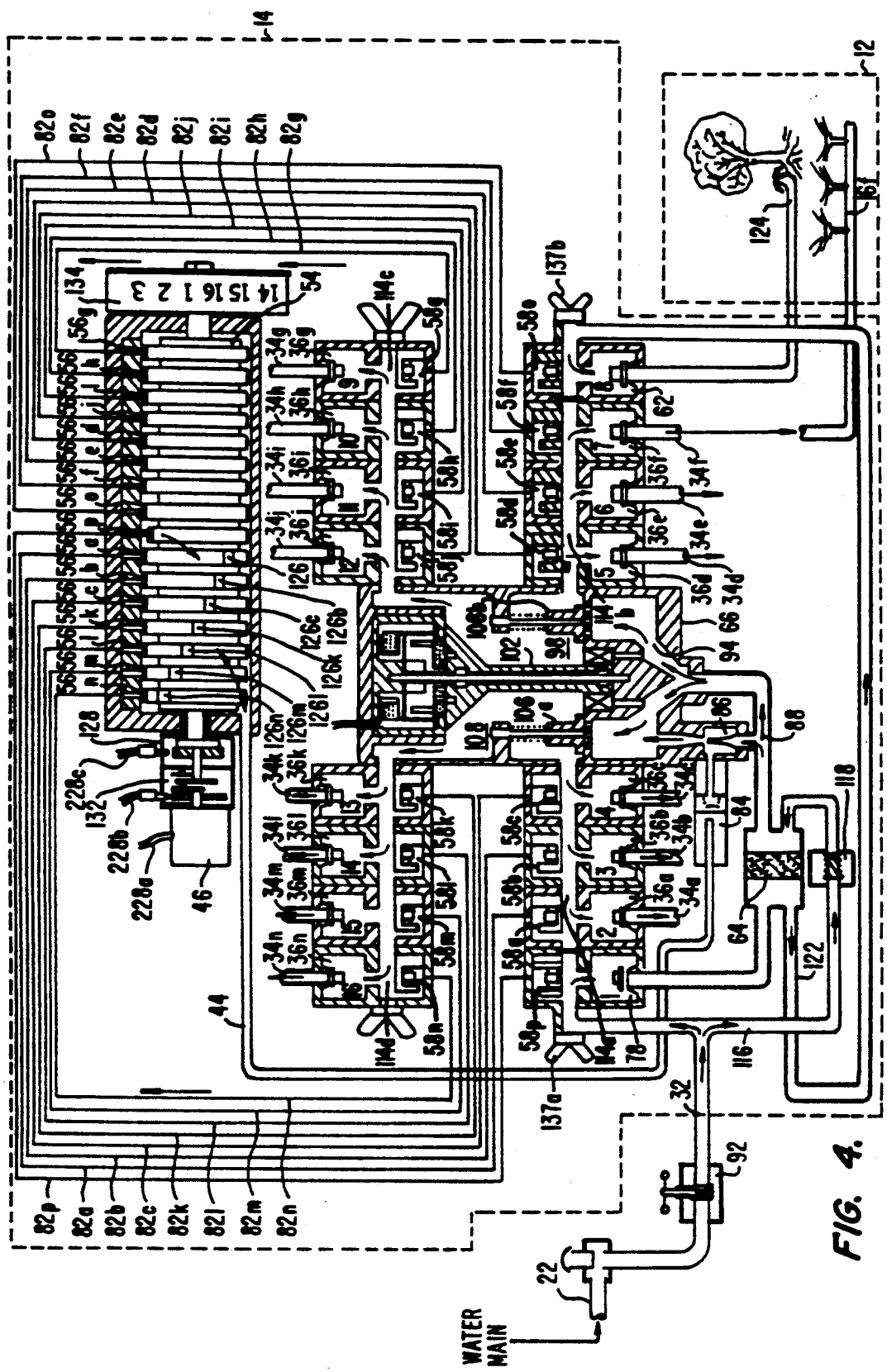
FIG. 4 is a schematic diagram of the flow connections between components according to one embodiment of the invention.

FIG. 4 depicts a system according to the present invention having a modular configuration. In the embodiment depicted in FIG. 4, sixteen modules are provided. Such a configuration could be used to provide separate flow control for up to sixteen sprinkler lines 16f. In the embodiment depicted in FIG. 4, however, two of the sixteen flow valves are used for special purposes. One of the flow valves 62 is used as a backflush valve. Another of the valves 78 is used as an in-flow control valve, described more fully below. The remaining valves 36a-36n control flow of pressurized water through water lines 34a-34n to the various sprinkler lines connected thereto (only sprinkler line 16f is shown). The flow valves 36a-36n, backflush valve 62, and in-flow control valve 78 are controlled by pilot valves 58a-58p, respectively. The pilot valves 58a-58p are, in turn, controlled by flow of water through bleed valves 56a-56p connected to the pilot valves 58a-58p by control fluid lines 82a-82p, respectively. Control fluid passing through the bleed valves 56a-56p is connected by bleed line 44, after passing through a bleed check valve 84, to the input of a Venturi nozzle 86. Pressurized water from the generator feed line 88, passing through the Venturi nozzle 86, creates a low pressure sufficient to draw the bleed fluid from the bleed line 44 into the generator 66 so that the bleed water is recycled.

Opening and closing of the bleed valves 56a-56p are controlled by a cam shaft 54. The cam shaft 54 has connected to it a plurality of cams, e.g., 126a-126c, 126k-126n. Preferably, the cams 126 can be added to or removed from the cam shaft 54, and can be adjusted in relative rotational position to adjust the timing or order of water flow, as described more fully below. The cam shaft 54 is connected, via a controllable clutch 128 and gear box 132 to a controllable stepper motor 46. A manual advance mechanism is provided for manually advancing the cam shaft to activate or deactivate a desired sprinkler line 16 by rotation of the manual advance dial 134.

As can be understood from FIG. 4, more or fewer sprinkler lines 16f can be controlled by adding or deleting control modules. Such a control module includes a flow valve, e.g., 36a, and its associated pilot valve 58a, bleed valve 56a, and the corresponding cam of the cam shaft 54. It can thus be seen that in order to provide for control of an additional sprinkler line 16, the only changes needed to the system are the provision of an additional module, as described above, and connection of the output from the new module to a flow line 34 for connection to the new sprinkler line 16. No new control equipment need be provided at the remote location 12 when such a module is added in the centralized control region 14. In one preferred embodiment, the individual modules are connected together by a threaded rod and one or more wing nuts 137a, 137b to provide for ease of addition or deletion of modules.

Water from the pressurized water source, such as the water main 22, passes through a stopcock 92 and, during normal operation, the major portion is eventually introduced into the generator 66. In the embodiment depicted in FIG. 4, the pressurized water is first introduced into the in-flow control valve 78. The in-flow control valve 78 is a normally opened valve, and can be used to terminate flow of water into the generator 66, as desired. The inflow valve 78 will be closed when the unit is not running. The pressurized water, after exiting the in-flow control valve 78, passes through a filter 64. The filter 64 is designed to remove particulates from the pressurized water, which might otherwise clog, abrade, or otherwise interfere with the operation of the generator 66, valves 36, or valve control mechanism 38, which come into contact with the water.

As noted above, a portion of the pressurized water introduced into the generator feed line passes through the Venturi nozzle 86. The major part of the water from the generator feed line 88 passes into the feed chamber 94 of the generator 66. The output from the Venturi nozzle 86, as well as the entrained bleed water, also passes into the feed chamber 94.

Figure 5:
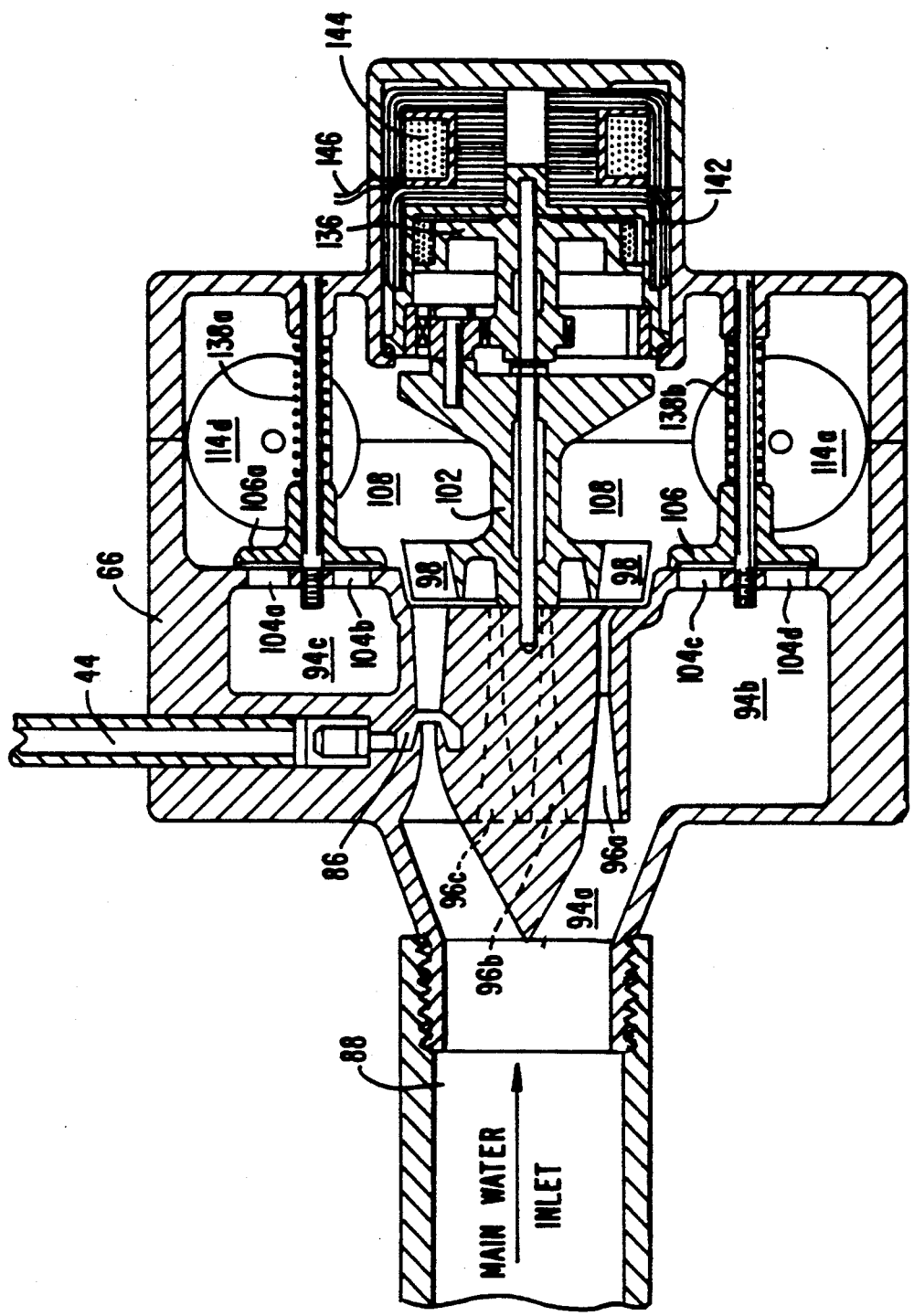
FIG. 5 is a cross-sectional view of the generator unit of the present invention.

As best seen in FIG. 5, the feed chamber 94 has two types of exits. Jet nozzle, exits 96a, 96b are always opened so that whenever pressurized water is present in the feed chamber 94, the water passes through the jet nozzles 96 to form jets which impact the impeller blades 98 of the generator 66, causing rotation of the generator shaft 102. The other exit from the feed chamber 94 is a set of bypass conduits 104 (FIG. 5), closable via bypass valves 106 in a manner described more fully below.

Water which exits from the feed chamber 94, either through the jet nozzles 96 or the bypass conduits 104, enters the rotor chamber 108. From the rotor chamber 108, the water enters a plenum 112 (FIG. 3), which is comprised of four conduits 114a-114d (FIG. 4). The conduits 114a-114d are in fluid communication with both the flow valves 36a-36n and the associated pilot valves 58a-58n, as described more fully below. The conduits 114a, 114c are separated from the inflow and backflush valves 78, 62 by baffles.

After the filter 64 has been used for removing particulates for some period of time, it will have to be cleaned or replaced to avoid clogging the system. The embodiment depicted in FIG. 4 provides for automatic backflushing (i.e., controlled by the centralized control station 14) of the filter 64 for cleaning thereof. According to the automatic backflush system, a backflush conduit 116 connects the pressurized water line 32 to the housing for the filter 64 to provide for flow in a direction opposite that of the normal flow of water through the filter 64 during filtration by closing the normally-open inflow valve 78. An intervening backflow check valve 118 prevents entry of unfiltered water into the generator 66 during non-backflush periods. Reverse flow of backflush water through the filter 64 is controlled by a backflush valve 62, preferably substantially similar to the flow valves 36, which is connected to the backflush outflow conduit 122. Outflow from the backflush valve 62 containing the effluent from the filter backflush can be treated as waste or, preferably, as depicted in FIG. 4, directed to a useful purpose, such as a tree-watering system 124.

FIG. 5 depicts the generator 66 of the invention in greater detail. The water inlet 88 containing pressurized water communicates with a Venturi nozzle 86 for drawing bleed water from the bleed line 44 and entraining the bleed water into the rotor chamber 108. The major portion of the feed water first enters the feed chamber 94a, 94b, 94c. A portion of the pressurized water in the feed chamber 94a, 94b, 94c is conducted by jet nozzles 96a, 96b, 96c to impact on the impeller blades 98, causing rotation of the generator shaft 102.

A certain amount of the pressure head from the pressurized water supply 88 is expended in causing rotation of the generator shaft 102. Because of the work done by the pressurized water in rotating the shaft 102, there is some resistance to flow in the feed chamber 94 which can be considered as a back pressure. The pressure in the feed chamber 94 can thus be considered as the pressure of the pressurized water 88 less the back pressure, representing resistance to flow. The amount of back pressure is directly related to the amount of work being done in rotating the shaft 102. The work which is expended can be attributed to both the rotational mass inertia of the rotor 102 and armature 136, as well as the braking effect of the generator. The amount of work expended during initial rotational acceleration of the shaft 102 is greater than the work expended in order to maintain the shaft 102 at a substantially constant rotational velocity. Accordingly, the back pressure is greatest during acceleration, and comes becomes less after the acceleration phase. For this reason, the total pressure in the feed chamber 94 is less during the acceleration phase (because of the large back pressure) than during the rotation-maintenance phase.

Bypass valves 106a, 106b are urged into a sealing relationship with respect to bypass conduits 104a, 104b, 104c, 104d by bypass valve springs 138a, 138b. The closing force provided by the springs 138a, 13b is of a magnitude against the pressure in the feed chamber 94 during the initial (acceleration) phase, but are overcome and opened by the increased pressure in the feed chamber 94 during the rotation-maintenance phase. In this way, substantially the entire pressure head in the feed chamber 94 can be used for powering the generator during the acceleration phase, but only a portion of the pressure head and a portion of the flow are used for rotating the generator shaft 102 during the rotation-maintenance phase of generator operation. By permitting bypass flow, pressure head loss during transit through the generator 66 is reduced during the rotation-maintenance phase, compared to the pressure head loss that would be experienced if no bypass was provided.

Water from the rotor chamber 108 is transmitted to the conduits 114a, 114b, 114c, 114d. The generator armature 136 is sealed from the generator stator 144. The power generated is transmitted by a wire 146 to the battery 68.

Figure 6:
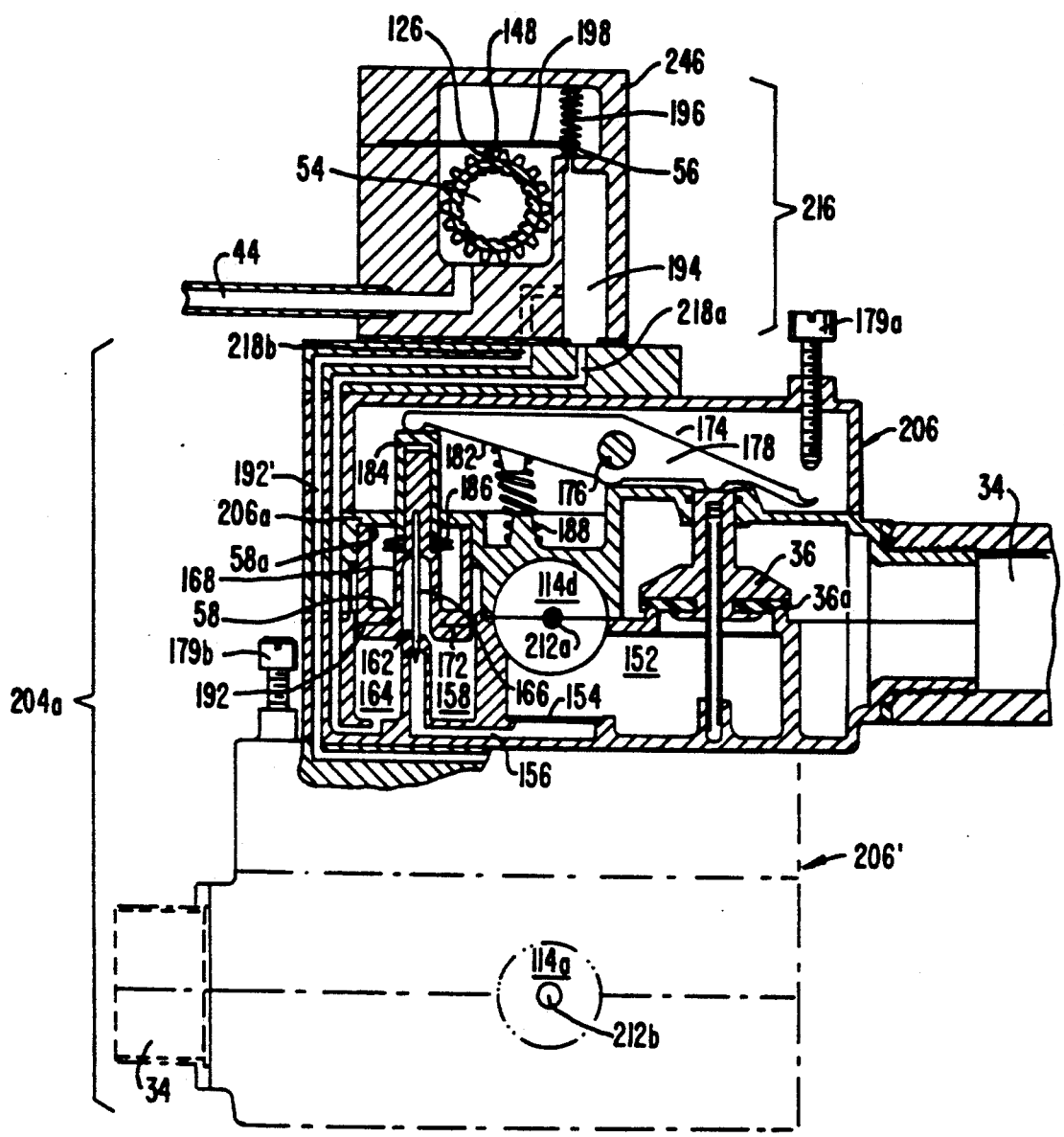
FIG. 6 is a cross-sectional view through an upper valve unit and control unit according to the present invention, showing the flow valve in a closed position and belville springs on the pilot valve.

FIG. 6 depicts in greater detail a control module, including a flow valve 36, pilot valve 58, bleed valve 56, and associated cam 126 and cam follower 148. Pressurized water enters through the conduit 114d and is contained in an entrance chamber 152. The flow valve 36, shown in FIG. 6 in the closed configuration, controls flow of pressurized water from the entrance chamber 152 to the water line 34. The entrance chamber 152 is also in fluid communication, through a filter 154 via a conduit 156, with a pressure chamber 158, which is adjacent the pilot valve 58. Fluid communication with the pressure chamber 158 occurs by way of a ring orifice 162, defined between the opening of a center guide member 164 and a needle guide 166 attached to the pilot valve 58. The combination of the center guide member 164 and needle guide 166 forms a self-cleaning structure. As the needle 166 moves vertically with respect to the guide 164, small particles, which found their way through the filter 154, are scraped from the needle 166 to prevent adherence thereto. Preferably, the ring orifice 162 has a diameter of about 0.07 inches (about 1.75 millimeters) and the needle 166 has a diameter of about 0.06 inches (about 1.5 millimeters).

The opening of the center guide member 164 is in fluid communication with the conduit 156. The pressure chamber 158 is separated from the region 168 above the pilot valve 58 by a rolling diaphragm member 172. Although other sealing devices are conceivable, the rolling diaphragm member 172 is provided in order to avoid blow-out, which could result with other devices since this sealing member is subjected to the full pressure of the water in the pressure chamber 158. The rolling diaphragm is particularly useful in a device, such as that shown in FIG. 6, in which the pilot valve 58 has a relatively long stroke. If a substantially flat diaphragm were used, in order to accommodate a long stroke, the diaphragm would have to have a large diameter, and the device would not be as compact as that shown in FIG. 6. The device shown in FIG. 6 requires a relatively long stroke because of the mechanical advantage provided by the lever 174. Furthermore, a flat diaphragm has substantially its entire surface exposed to a relatively high pressure, whereas only a small portion (i.e., the bent portion) of the rolling diaphragm experiences a pressure differential when the pressure chamber 158 is pressurized, with the remainder of the rolling diaphragm being supported or backed up, as described below.

The diameter of the cylinder for the pilot valve 58 is less than or equal to the flow valve diameter 36. Interconnection between the pilot valve 58 and flow valve 36 is made using the lever 174, which pivots about a pivot stud 176. A helical spring 188 biases the lever 174 toward the configuration depicted in FIG. 6. The lever 174 has a first arm 178 which contacts the flow valve 36, and a second arm 182 which is operatively connected to the pilot valve 58. In order to provide the desired mechanical advantage, the moment arm of the lever portion which follows the movement of the pilot valve 182 is longer than that of the second portion of the lever 178, and, correspondingly, the travel of that portion 182 is longer in order to provide the desired mechanical advantage.

As the flow valve 36 is used, the valve seat 36a will undergo normal wear. As the valve seat 36a wears, the valve 36 must be depressed a corresponding amount in order to maintain a seal in the closed position depicted in FIG. 6. As the valve seat 36a wears, resulting in an increasingly depressed flow valve 36, some device must be provided to produce a corresponding increase in the stroke of the pilot valve in order to position the flow valve 36 in the increasingly depressed position. One possible solution, which is not the preferred solution in the present invention, is to configure the pilot valve 58 so that when the pilot valve 58 is in the uppermost position, it does not "bottom out" (i.e., the upper rim 58a does not contact the top of the pilot valve cylinder 206a. In such a non-preferred embodiment, there is some head room between the pilot rim 58a and the cylinder 206a, which permits increased stroke of the pilot valve 58 as the flow valve seat 36a wears. This non-preferred embodiment, however, has at least one difficulty related to the rolling diaphragm 172, reducing the chance of blow-out. In the non-preferred embodiment, because the valve 58 does not bottom out, the rolling diaphragm 172 does not lie flush against the wall above the diaphragm when the pressure chamber 158 is pressurized. Because there is a space above the rolling diaphragm 172, in order for the diaphragm to withstand the pressure of the pressurized chamber 158, the rolling diaphragm 172 must be quite strong, usually requiring a reinforced diaphragm 172, reducing the chance of a blow-out. This configuration, although operable, is not preferred because of the expense of a reinforced diaphragm 172.

Figure 7:
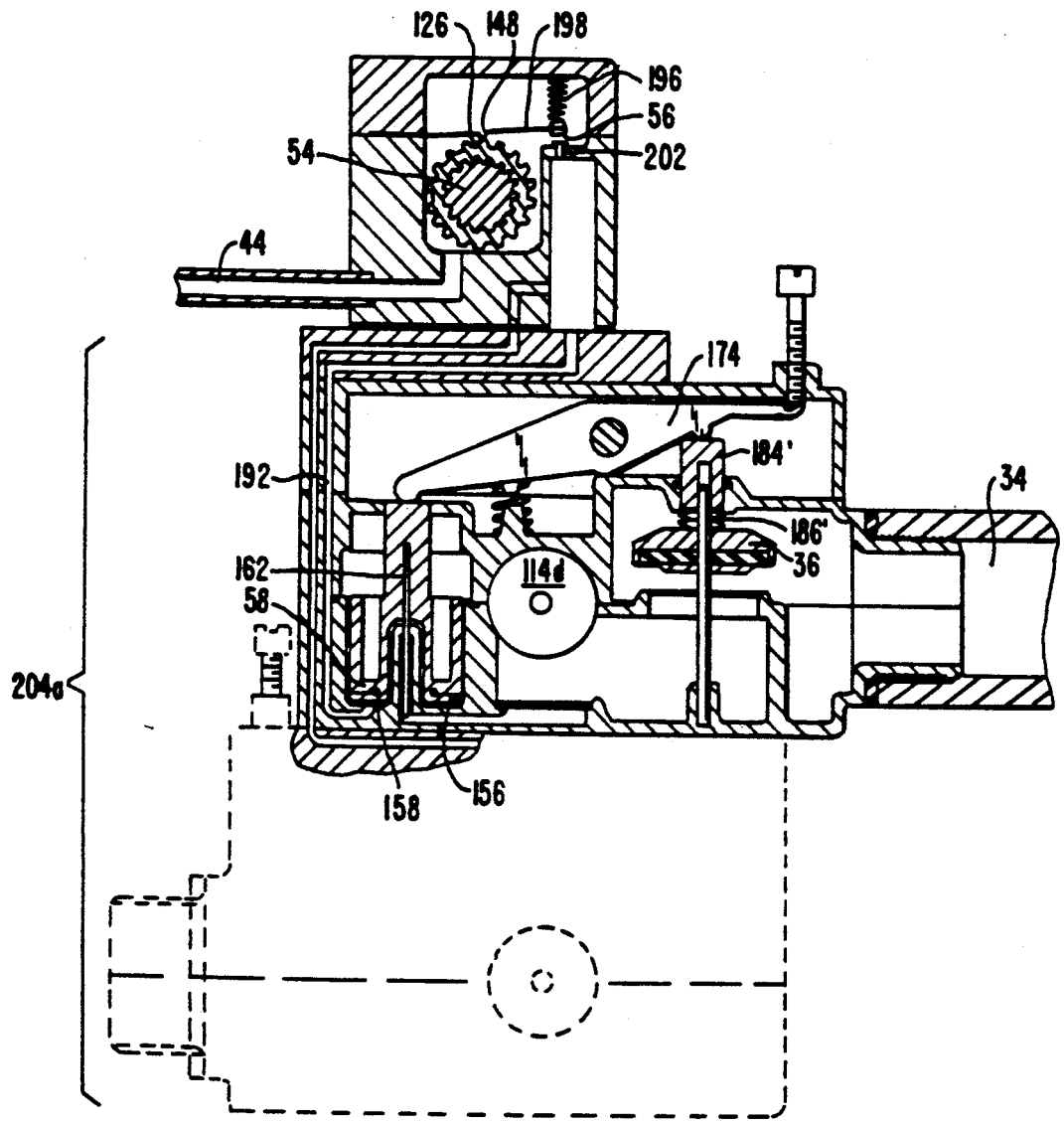
FIG. 7 is a cross-sectional view generally corresponding to FIG. 7, but showing the flow valve in an opened configuration and belville springs on the flow valve.

The preferred solution to the wear of the flow valve seat 36a is that depicted in FIGS. 6 and 7. As shown in FIG. 6, the lever 174 does not directly contact the pilot valve body 58 but, rather, contacts a plunger 184 which, in turn, operates on the pilot valve body 58 by way of a spring 186. A similar configuration is depicted in FIG. 7, except that the plunger 184' and spring 186' are connected to the flow valve 36. Although a number of types of springs are operable, the preferred spring is a belville spring, which is particularly useful because it provides the necessary force while taking up little space. As noted above, the rolling diaphragm 172 also provides the advantage of taking up little space. The preferred embodiment depicted in FIG. 6, therefore, is particularly useful in many types of sprinkler valves where small volume and low cost are desirable, e.g., in connection with solenoid valves found in previous sprinkler systems. In the configuration depicted in FIG. 6, before there has been substantial wear of the pilot valve seat 36a, the belville spring 186 is in a stressed condition when the pilot valve 58 is in the uppermost position (i.e., is bottomed out). However, as the pilot valve seat 36a wears, the spring 186 is in a somewhat expanded or less stressed condition because it provides a force to push the plunger 184 upward a sufficient amount to compensate for the increased downward position of the flow valve 36. In this way, the pilot valve 58 continues to bottom out in the uppermost configuration (thus assuring that the diaphragm 172 will lie flush against the wall above), while still providing sufficient increased stroke to force the flow valve 36 into a sealing position.

A control fluid line 192 provides fluid communication between the pressure chamber 158 and a second chamber 194. The second chamber 194 is provided because it facilitates the manufacture of the device. In particular, it is relatively difficult to form and properly align conduits which are long and relatively thin. Therefore, the second chamber 194, which is more easily formed than a long, thin conduit, is used. As will be apparent to those skilled in the art, other configurations are also possible. Exit from the buffer chamber 194 is controlled by the bleed valve 56. The bleed valve 56 is urged toward the closed configuration, depicted in FIG. 6, by a helical spring 196. Connected to the bleed valve 56 is a deflectable finger 198. The deflectable finger 198 includes a detent portion forming the cam follower 148. The cam follower 148 is positioned adjacent to the cam shaft 54 bearing a plurality of cams, one of which (126) is longitudinally aligned with the finger 198 attached to the bleed valve 56.

As can be seen from FIG. 6, a portion of the pressurized water from the entrance chamber 152 is conveyed through the ring aperture 162 into the pressure chamber 158. Because the only route of escape from the pressure chamber 158, namely the bleed valve 56, is closed, the pressure chamber 158 will become pressurized. Pressurization of the pressure chamber 158 tends to force the pilot valve toward the upward configuration depicted in FIG. 6. In order to be positioned in the upward configuration depicted in FIG. 6, the force transmitted by the lever 174 to the top of the flow valve 36 must be sufficient to overcome the force of the pressurized water in the entrance chamber 152 on the bottom of the flow valve 36, which tends to open the valve. In the preferred embodiment, the lever 174 has moment arms which give a mechanical advantage to the pilot valve 58, so that the pilot valve 58 is maintained in the upper configuration, depicted in FIG. 6, even though the force from the pressure chamber 158 on the bottom of the pilot valve 58 is smaller than, or does not significantly exceed, the force from the pressurized water in the entrance chamber 152 on the bottom of the flow valve 36.

The opening of the flow valve 36 is ultimately controlled by the opening of the bleed valve 56. As depicted in FIG. 7, the bleed valve 56 is opened when the cam shaft 54 rotates to a position such that a cam 126 contacts and moves the cam follower 148 of the deflectable finger 198 against the urging of the spring 196. This movement opens the valve 56 to permit flow from the pressurized chamber 158, through the control fluid line 192, out the opening 202 of the bleed valve, and through the bleed line 44, preferably for recycling as described above. At the same time that fluid is leaving the pressure chamber 158 through the fluid control line 192, it is also entering the pressure chamber 158 through the conduit 156. However, the ring orifice 162 is sized to control the flow rate such that, for a given pressure of the incoming pressurized water through the entrance conduit 114d, the rate of flow into the pressure chamber 158 is no more than the rate of flow out of the pressure chamber 158. For this reason, when the bleed valve 56 opens, the pressure chamber 158 depressurizes.

When the pressure chamber 158 depressurizes, the upward force on the pilot valve is no longer sufficient to overcome the fluid pressure on the bottom of the flow valve 36. Thus, the flow valve 36 is moved upward to the configuration depicted in FIG. 7, opening the flow valve 36 to permit outflow of the main portion of the pressurized water through the flow valve 36 and into the water line 34. As seen in FIG. 7, as the flow valve 36 moves upward, it pivots the lever 174 such that the lever 174 pushes the plunger 184 downward, in turn pushing the pilot valve 58 downward towards the position depicted in FIG. 7, simultaneously unrolling the rolling diaphragm 172. Thus, during operation of the valve unit 206, the pilot valve and flow valve move in different, preferably substantially opposite, directions. The maximum opening of the flow valve can be adjusted by set screws 179a, 179b which limit the excursion of the lever 174. In this way, a relatively small rotation of the cam shaft 54 results in a change of state from the closed flow valve configuration depicted in FIG. 6 to the opened flow valve configuration depicted in FIG. 7. Continued electrical energization of the motor 46 or other components is unnecessary to hold the flow valve 36 in the opened configuration, since the pressure of the inflowing water is sufficient to maintain the flow valve 36 opened.

After a period of time, the cam shaft 54 is rotated to move the cam 126 out of contact with the cam follower 148, closing the bleed valve 56, and thus permitting pressurization of the pressure chamber 158, causing the pilot valve 58 to return to the upward configuration depicted in FIG. 6. The upward movement of the pilot valve 58, via the plunger 184, places a pivoting force on the lever 174. Because of the mechanical advantage provided by the relative moment arms of the lever 174, the force tending to hold the flow valve 36 opened is overcome, and the lever 174 pivots towards the position depicted in FIG. 6, thus closing the flow valve 36.

Figure 8:
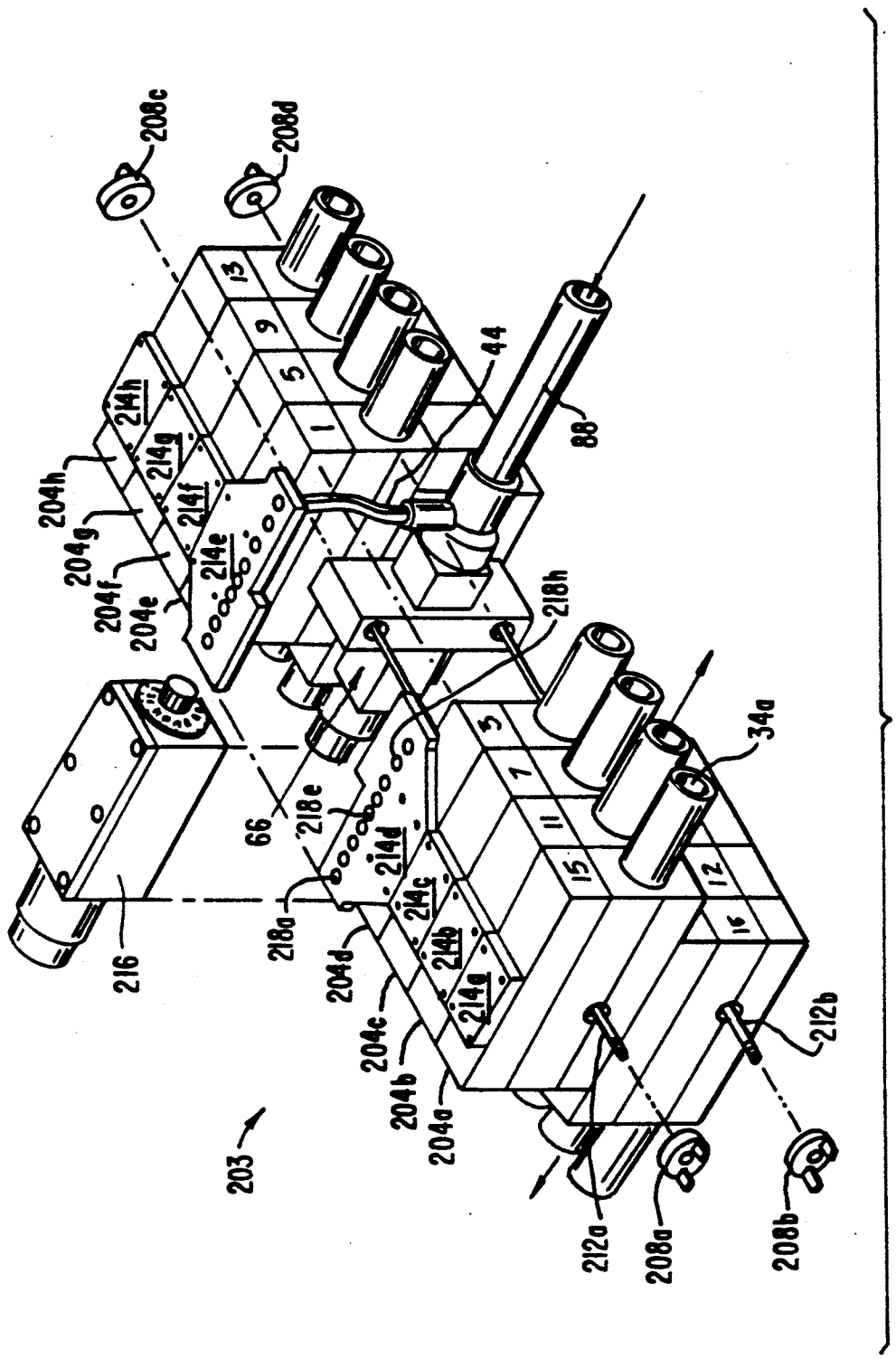
FIG. 8 is an exploded perspective view of the control unit according to the present invention.

FIG. 8 depicts a preferred embodiment of a central control device 203 which includes a plurality of modules 204a-204h, each operating substantially similarly to the manner of operation of the module 204a depicted in FIGS. 6 and 7. As can be seen from FIGS. 6 and 7, in the preferred embodiment, each module 204a includes two valve units 206, 206', each controlling a water line 34 and each ultimately controlled by its own bleed valve 56 and corresponding cam 126. Preferably, for ease of construction, part of the fluid control line 192' of the lower unit 206' passes through a portion of the upper unit 206. As will be apparent to those skilled in the art, modules could also be provided which have only a single unit, such as 206, or which have three or more units in each module.

In a preferred embodiment depicted in FIG. 8, the modules are attached together by the compressive force of wing nuts 208a, 208b, 208c, 208d attached to threaded ends of rods 212a, 212b. By tightening the wing nuts 208a, 208b, 208c, 208d, the modules 204a-204h are compressed together. In the compressed configuration, various conduits in each module 204 are aligned to form a larger conduit. For example, the water conduits 114d in modules 204a-204d are aligned, and form a larger conduit as depicted in FIG. 4. In order to provide for leak-free operation of the controller, the modules 204a-204h include substantially flat faces, at least in the regions which abut with adjoining modules. O-rings are provided between the modules to establish a fluid seal, for example, between portions of the water conduit 114d. Preferably, the tie rods 212a, 212b extend through the conduits 214, as best seen in FIG. 6. Although FIG. 8 depicts two tie rods 212a, 212b, other operable configurations can be provided which have only one tie rod or more than two tie rods.

Figure 9:
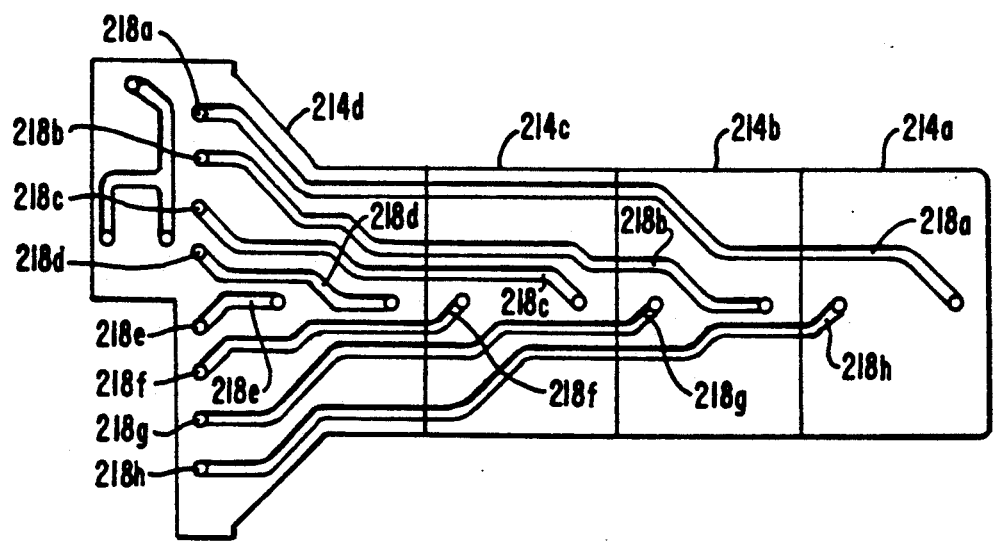
FIG. 9 is a bottom perspective view of manifold plates for the central control unit.

Plates 214a-214h define fluid pathways, such as by channels formed on the underside thereof, as depicted in FIG. 9. These pathways 216 control the flow of fluid from each fluid control line 192 to the corresponding buffer chamber 194 and bleed valve 156, which are contained in the bleed valve unit 216.

FIG. 9 depicts the underside of the plates 214a-124d, showing a first set of channels 218a-218d for conveying water from the respective control fluid lines 192 of the upper units 206 of each of the first four modules 204a-204d, to outlets 218a-218d in fluid communication with the respective chambers 194 contained in the bleed valve unit 216. Similarly, channels 218e-218h provide communication between the control fluid lines 192' for the lower units 206' of the first four modules 204a, 204b, 204c, 204d, to outlets 218e-218h leading to the respective buffer chambers 194 of the bleed valve unit 216.

Because the valve units are modularized, the depicted device can be expanded or reduced in size to provide for control of more or fewer sprinkler lines by adding or removing modules, such as 204a.

Figure 10:
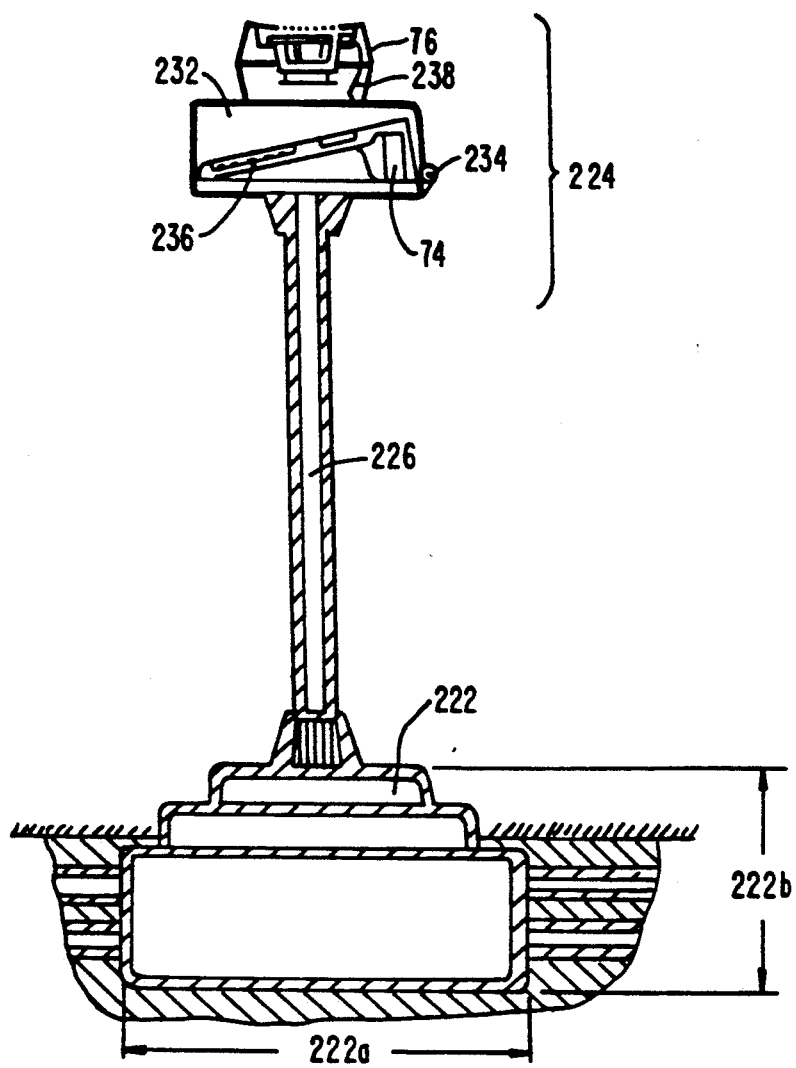
FIG. 10 depicts a rain-moisture detection unit and control unit housing according to the present invention.

The centrally located apparatus 14 can be housed in a number of possible configurations. In one preferred configuration, the flow valves 36, controller 38, motor 46, and power source 52 are contained in a housing 222 which can be positioned at least partially underground for connection with underground water pipes, as depicted in FIG. 10. The housing 222 has a length 222a, a height 222b, and a width 222c. Preferably, the sum of the length, width, and height is less than 10.25 times the nominal size of the water inlet pipe 22. Preferably, the volume of the control apparatus 203, including the union joints described below, occupies a volume in cubic inches, which is less than or equal to the nominal size of the flow valves times the sum of 23 plus the number of flow valves. In the depicted preferred embodiment, the motor controller 48, including a microprocessor 74 and a moisture sensor 76, is provided in an above-ground portion 224 connected to the housing 222 by a stem 226, which also contains electric wiring 228a, 228b, 228c (FIG. 4), for connection to the motor 46, controllable gear box 132, and controllable clutch 128. The computer 74, containing a microprocessor, is enclosed in a hinged box 232 which can be opened using the hinge 234 to provide access to a keyboard 236 attached to the computer 74. The keyboard 236 allows the user to provide input to the computer 74 to control the timing and operation of the sprinklers.

Preferably, a moisture sensor 76, such as that described above, is mounted over the hinged box 232 and is connected to the computer 74 by wiring 238. The moisture sensor provides a signal to the computer 74 when moisture, such as from atmospheric precipitation, is detected. Preferably, the moisture sensor 76 includes a means for removal of collected water, such as by evaporation through a wick, to provide an indication of moisture content which is related to the effective moisture content of the ground. An overflow tube is provided which conveys water away from the reservoir after the reservoir is filled to a predetermined level. Holes in the bottom of the reservoir communicate with the wick, preferably of a sponge-like material, and permit the rate of evaporation from the reservoir to be influenced by both air-flow and sun in order to simulate the evaporation of moisture from the ground. The sponge-like material expands when moistened so that when collected water enters the reservoir, the wetted wick expands sufficiently to prevent rapid flow of the collected water through the holes in the bottom of the reservoir. As the wick dries, it contracts sufficiently to permit flow of water through the holes, thus maintaining the wick in a wetted condition as long as water remains in the reservoir. In this way, the wick acts as a type of valve, effectively closing the holes in the bottom of the reservoir as long as collected water resides in the reservoir. The above-ground portion 224 can be further provided with decorative or secondary functional aspects, including a bird feeder (not shown).

Figure 11:
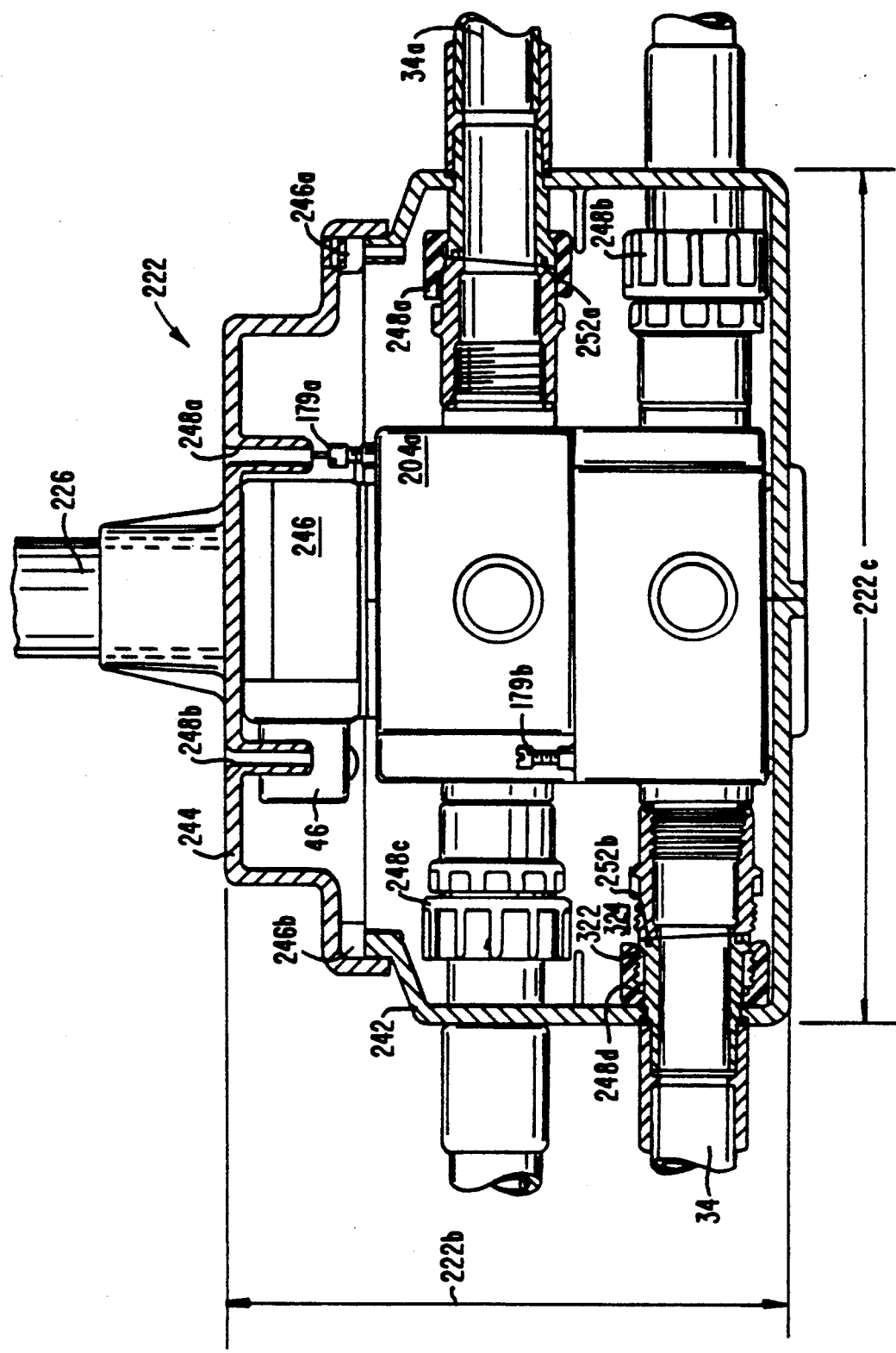
FIG. 11 is an end elevational view of the control unit of the present invention showing a housing therefor in cross-section.

As shown in FIG. 11, the housing 222 preferably includes a body portion 242 and a removable cap 244 attached to the body portion 242 by, for example, bolts 246a, 246b. Preferably, openings 248a, 248b are provided in the cap 244 aligned with the set screws 179a, 179b for adjustment thereof, as described above, without removal of the cap 244. Preferably, as depicted in FIG. 10, the cap 244 is positioned above-ground to permit its ready removal and provide for access to the interior of the housing 222 when desired. Access to the interior of the housing might be needed, for example, in order to add, remove, or rotate cams 126 on the cam shaft 54 (FIG. 6) or to add or remove modules 204.

Figure 12A:
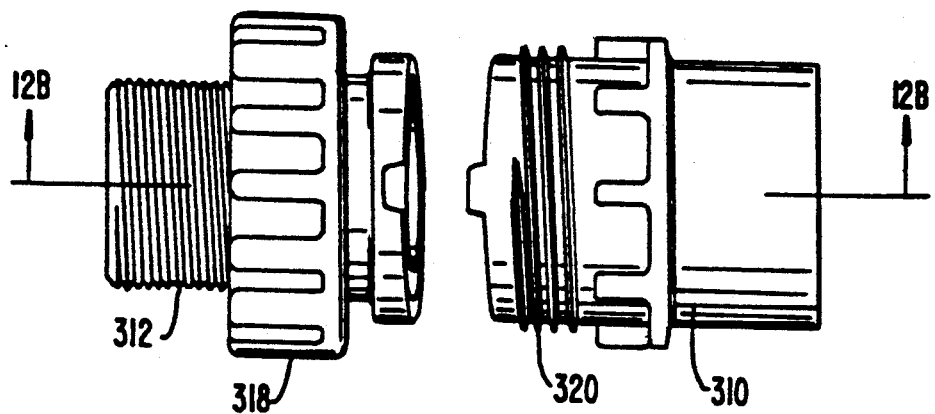
FIG. 12A is a top view of an angled union joint, according to the present invention.
Figure 12B:
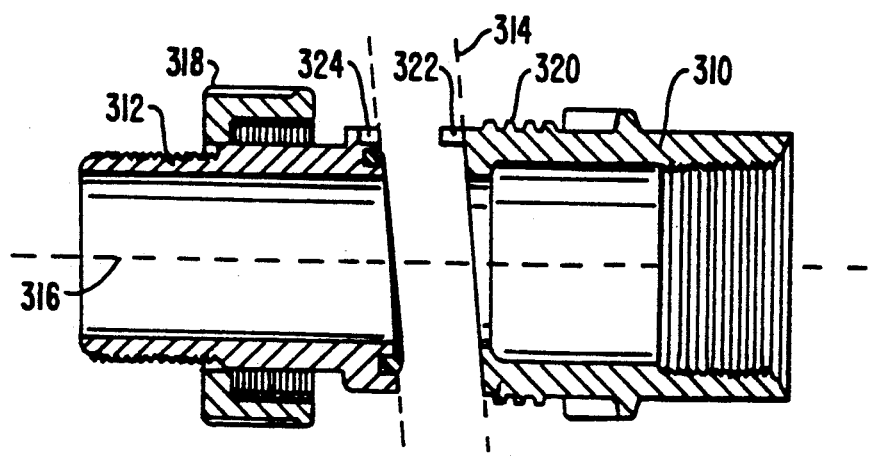
FIG. 12B is a cross-section taken along line 12B—12B of FIG. 12A.

In order to facilitate removal of the central control device 203 from the housing 222, the connections of the water pipes 34a, 34b with the modules 204 are preferably by way of an angled union joint. As shown in FIG. 12A, the portions of pipe 310, 312 have ends meeting at complimentary angles. As best seen in FIG. 12B, the plane 314, defined by the end faces of the pipes 310, 312, is not perpendicular to the common longitudinal axis 316 of the pipes 310, 312. The pipes 310, 312 can be joined by a variety of means, such as clamps, latches, welding, brazing, and the like. Preferably, they are joined by a joining device, such as a longitudinally movable threaded collar 318 and corresponding threads 320. By using the angled union joints, the contents of the housing 222 can be easily disconnected by loosening the screw collars 248a, 248b, 248c, 248d, retracting the collars, as shown at 248d. The union joints are preferably contained within the housing 222. The union joints are configured to provide for ease of disconnect and reconnect of the control device to the water line 88 and sprinkler lines 34. The angled nature of the union joints maintains the apparatus in the proper orientation with respect to the water line 88 and sprinkler lines 34 during such disconnect and reconnect. Thus, during disconnect, the collars 318 can be loosened one at a time without the need for supporting the control device 203 during this operation. Following loosening of the screw collars 248, the control device 203 can be removed by lifting the assembly straight upward. If no taper were provided, removal of the unit would be difficult because of the need for supporting the control device 203 during the task of loosening the collars 248. When the unit is reinstalled in the housing 222, the various pipes will be easily and automatically aligned to the proper position, both vertically and laterally. If no taper were provided, replacement of the unit would be difficult because there would be no device for aligning the various pipes and for maintaining alignment while tightening the collars. The described advantages of straight upward disassembly and automatic alignment are generally present in angled union joints, and such angled union joints can be used in contexts other than the sprinkler device described.

The angled nature of the union joints is further useful because connection can be easily made by tightening the screw collars 248 while avoiding damage to the seals 252a, 252b. In previous union joints, typically non-angled, tightening of screw collars subjected seals, such as 252a, 252b, to abrasion as the pipes being joined were rotated, relative to each other, about their longitudinal axes. Because, in the configuration shown, several angled union joints are provided, such relative rotation is avoided and thus damage to the seals 252a, 252b is avoided. A union joint can be provided having a locking tab 322 and corresponding recess 324 (FIG. 12) to assist in preventing such relative rotation. Such a tab 322 is particularly useful in preventing relative rotation when a single pair of angled pipes are to be joined. In the configuration shown, in which several angled union joints are provided, the tab 322 additionally assists in alignment of the plurality of union joints. Thus, when replacing the unit, the tabs act as stops to position and maintain alignment of the pipe while tightening the collars.

In operation, and as shown in FIG. 4, upon activation of the motor 46, following a command from the motor controller 48, the cam shaft 54 is rotated from the position depicted in FIG. 4 to a position in which one of the cams 126 opens one of the bleed valves 56. For purposes of discussion, the operation will be described in a configuration in which the bleed valve 56a is opened.

When valve 56a is opened, water from the pressurization chamber of the corresponding pilot valve 58a is removed through fluid control line 82a, and exits through bleed line 44 through a check valve 84, and is drawn by a Venturi 86 into the generator 66. Because of the depressurization of the pressure chamber of the pilot valve 58a, the flow valve 36a opens. This permits pressurized water from the inlet 114a to flow out of the water line 34a to a sprinkler line similar to the line depicted in FIG. 4. Water from the pressurized water source 22, enters through the pressurized water line 32, and flows through normally opened in-flow control valve 78 through the filter 64 and into the generator 66. Initially, the entire flow of pressurized water entering the generator 66 is directed through the jet nozzles 96 to impact the impeller blades 98, causing rotation of the generator shaft 102 and creating electrical energy which is stored in the battery 68, as described above. The pressurized water then enters into the conduits 114 whence, as described above, a portion flows through the flow valve 36a to the sprinkler line. After the generator shaft 102 has accelerated to a minimum rotational speed, so that back pressure in the entrance chamber 94 of the generator 66 is reduced, the bypass valves 106 open, reducing the generator pressure drop as discussed above.

In accordance with the programming and data stored in the computer 74, after a predetermined amount of time, the motor 46 rotates the cam shaft 54 so as to move the cam 126a away from the corresponding finger 198, thus closing the bleed valve 56a. Thereupon, the pressure chamber of the corresponding pilot valve 58a is pressurized, causing closure of the corresponding flow valve 36a, as described above. Rotation of the cam shaft 54 by the motor 46 under control of the computer 74 can be used to open additional bleed valves 56, either sequentially or simultaneously depending on the placement and order of the cams 126 on the cam shaft 54.

At a time determined by the computer 74, the motor 46 will rotate the cam shaft 54 so as to open the bleed valve 56o, which controls the backflush valve the inflow valve 78. Opening of the backflush valve permits flow of water from the backflush conduit 116 through the filter 64 in a flow direction opposite the normal flow direction, through the backflush valve 62 and out the backflush drain 124.

A number of variations and modifications of the described apparatus can be used. Although the described apparatus includes numerous features, certain of these can be used without employing others. For example, the described centralized feature, or the described modular feature, could be used without using a generator and/or the bleed/pilot valve system. Control means other than computer control means could be used, such as mechanical control means, hydraulic control means, and the like. A system could be devised which did not include a battery, such as by providing output from a generator or solar cell directly to the devices which consume energy. Other types of generators could be used in place of the described generator, such as non-fixed vein generators, reaction-types generators, and the like. Certain aspects of the invention could be used without providing a generator, such as by using electricity generated by solar cells or by using public utility current. Although the described apparatus sends substantially the entire flow of pressurized water through the generator housing, other devices could be provided in which the pressurized water flow was split, by sending one portion of flow to the generator, another to the sprinkler, and yet another portion to the bleed valve/valve control system, either simultaneously or on a time-shared basis. Although the described embodiment preferably includes a moisture sensor, the system could be provided without such a moisture sensor or could include a plurality of moisture sensors in various locations.

Although the description of the invention has included a description of the preferred embodiment and various modifications and variations, other modifications and variations can also be used within the scope of the present invention, the present invention being described by the following claims.

What is claimed is:

1. Apparatus usable for distributing water among a plurality of sprinkling lines, comprising:

a central control device for receiving water from a pressurized water source line and controlling occurrence of a plurality of change-of-state events, without the necessity for sending electrical signals from said central device to locations at said sprinkling lines, each change-of-state event selected from the group consisting of initiation of flow of water to at least one of said plurality of sprinkling lines and cessation of water flow to at least one of said plurality of sprinkling lines, said control device including:

a plurality of controllable valve means for controlling flow of said water, each of said valve means effecting at least one of said change-of-state events;

operating means for hydraulically operating said valve means, in the absence of electrical activation of said operating means;

drivable means for controlling said operating means including a cam shaft driven by said drive means an operably connected to said controllable valve means for actuating said valve means;

controllable drive means for driving said drivable means; and electronic computing means for programmably controlling said controllable drive means wherein said drive means drives said drivable means only during one of said change-of-state events.

2. Apparatus, as claimed in claim 1, wherein said controllable drive means is a stepper motor.

3. Apparatus, as claimed in claim 1, wherein said drive means consumes energy only during said change-of-state events.

4. Apparatus, as claimed in claim 1, wherein said operating means comprises at least first and second controllable motors, and said drivable means comprises first and second cam shafts, wherein said electronic computer means controls both of said first and second controllable motors.

5. Apparatus, as claimed in claim 1, wherein said computing means includes means usable for providing a programmed watering schedule, said schedule including pulsed watering, wherein at least one of said plurality of sprinkling lines is operated a programmable number of periods of watering per day, said periods of watering having a programmable duration.

6. Apparatus, as claimed in claim 5, wherein said number of periods per day is between about 10 and about 200.

7. Apparatus as claimed in claim 5, wherein said duration is between about five seconds and about one hour.

8. Apparatus, as claimed in claim 5, wherein said computing means includes means usable for providing a programmed watering schedule, said watering schedule for programmably controlling said controllable drive means over a period greater than one year, said watering schedule usable to provide a different watering schedule for any two consecutive days in said period.

9. Apparatus as claimed in claim 8, wherein said period is about 30 years.

10. Apparatus usable for distributing water among a plurality of sprinkling lines, comprising:
   first means for generating electrical power using the pressure head of a source of pressurized water which flows through the out of said first means;
   a controllable electric motor, using said electrical power generated by said first means to provide rotational power;
   a cam shaft, connected to said electric motor for rotation of said cam shaft, said cam shaft having a plurality of cams;
   a plurality of bleed valves operably connected to said cam shaft by cam followers, said bleed valves movable from a closed configuration to an open configuration permitting flow of bleed water, said movement of said bleed valves being effected by contact of said cams with said cam followers;
   a plurality of pilot valves movable from a first configuration to a second configuration, each pilot valve adjacent to a corresponding pressurization chamber wherein pressurization of one of said pressurization chambers maintains said corresponding pilot valve in said first configuration;
   means for providing fluid communication to permit flow from each of said pressurization chambers to a corresponding bleed valve, wherein movement of said bleed valve to said open configuration depressurizes said pressurization chamber;
   a plurality of flow valves, each movable from a closed configuration to an open configuration permitting throughflow of water from a flow valve inlet to a flow valve outlet;
   first means for connecting each flow valve to a corresponding pilot valve wherein said means for connecting positions said flow valve in said closed position when said pilot valve is in said first position and wherein said means for connecting positions said pilot valve in said -second position when said flow valve is in said open position;
   second means for connecting said flow valve outlet of at least a first of said flow valves to at least a first of said plurality of sprinkling lines;
   means for controlling said controllable motor to effect rotation of said camshaft from a first position to a second position;
   wherein said camshaft in said first position permits positioning of at least a first cam follower in a first position closing a first of said bleed valves, permitting pressurizing of a first of said pressurization chambers, maintaining a first of said pilot valves in said first configuration and maintaining said first flow valve in said closed configuration; and
   wherein said camshaft in said second position positions said first cam follower in a second position, opening said first bleed valve, depressurizing said first pressure chamber, permitting said flow valve to open and to move said means for connecting to position said pilot valve in said second position.

11. Apparatus, as claimed in claim 10, further comprising means for conveying said water which flows out of said means for generating to said flow valve input.

12. Apparatus, as claimed in claim 11, wherein said pilot valve is a center-guide valve further comprising:
   a center-guide needle extending longitudinally from said valve; and
   a needle guide surrounding a portion of said needle and defining a ring orifice therebetween, said ring orifice providing fluid communication between said pressure chamber and a source of pressurized water, defining a first rate of flow into said pressurized chamber when said source of pressurized water is at a first pressure.

13. Apparatus, as claimed in claim 12, wherein said means for providing fluid communication has a dimension providing for a flow rate of said flow from said pressure chamber to said bleed valve which is greater than said first flow rate when said source of pressurized water is at said first pressure.

14. Apparatus, as claimed in claim 10, further comprising means for conveying said water which flows out of said means for generating to at least a first of said pressurization chambers.

15. Apparatus, as claimed in claim 10, further comprising:
   electric power storage means for storing power generated by said means for generating; and
   means for conveying said stored power to said controllable electric motor.

16. Apparatus, as claimed in claim 10, wherein said means for generating said electrical power comprises a turbine generator.

17. Apparatus, as claimed in claim 16, further comprising means for producing at least a first jet of water from said source of pressurized water for use in rotating said turbine generator.

18. Apparatus, as claimed in claim 10, wherein said means for connecting each flow valve comprises a lever pivotable about a first pivot point, having a first portion operably connected to said pilot valve and having a second portion operably connected to said flow valve.

19. Apparatus, as claimed in claim 18, wherein:
said throughflow contributes a force tending to maintain said flow valve in said open position; and wherein
said lever provides a mechanical advantage such that the force required to move said pilot valve from said first to said second position is less than the force tending to maintain said flow valve in said open position.

20. Apparatus, as claimed in claim 10, wherein said means for controlling comprises a microprocessor.

21. Apparatus, as claimed in claim 10, further comprising:
means for sensing precipitation and for providing a signal in response to sensed precipitation; and
means for conveying said signal to said means for controlling.

22. Apparatus, as claimed in claim 10, further comprising:
filter means for filtering said water from said pressurized water source by flowing said water through said filter in a first direction; and
means for automatically flowing water through said filter in a direction opposite to said first direction to backflush said filter.

23. Apparatus, as claimed in claim 10, further comprising a plenum for receiving said pressurized water, said plenum being in fluid communication with said plurality of flow valve inlets.

24. Apparatus, as claimed in claim 10, further comprising means for conveying said bleed water away from said bleed valves to combine with at least a portion of said pressurized water.

25. Apparatus, as claimed in claim 10, wherein said pilot valve comprises a rolling diaphragm.

26. Apparatus, as claimed in claim 10, wherein one of said pilot valve and said flow valve includes:
a valve body;
a plunger, operably connected to said first means for connecting; and
means for resiliently connecting said plunger to said valve body.

27. Apparatus, as claimed in claim 26, wherein said means for resiliently connecting comprises at least a first pair of belville spring washers.

28. Apparatus, as claimed in claim 10, wherein said plurality of pilot valves each has a diameter, and wherein said plurality of flow valves each has a diameter, the diameter of each pilot valve being no greater than the diameter of said corresponding flow valve.

29. Apparatus, as claimed in claim 10, further comprising a single housing, wherein all other components of said apparatus are centralized so as to be contained in said single housing.

30. Apparatus, as claimed in claim 29, further comprising at least a first union joint for connecting said apparatus to at least a first water supply line having a longitudinal axis, and at least a second union joint for connecting said apparatus to at least a first sprinkler line having a longitudinal axis.

31. Apparatus, as claimed in claim 30, wherein each of said union joints defines a plane non-orthogonal to the axes of said water supply line and sprinkler line.

32. Apparatus, as claimed in claim 30, wherein said union joints reside within said housing.

33. Apparatus, as claimed in claim 30, wherein said flow valves have a nominal size and wherein said apparatus occupies a volume, in cubic inches, which is not greater than about nominal size of said flow valves times the sum of the number of flow valves and 23.

34. Apparatus, as claimed in claim 29, wherein said housing has a width, a length, and a height, and wherein said source of pressurized water is a water line having a nominal size, the sum of said width, said length, and said height being about equal to $10.25 \times$ the nominal size of said water line.

35. Apparatus, as claimed in claim 10, further comprising:
photoelectric means for producing electrical power from sunlight; and
means for conveying said power produced by said photoelectric means to said controllable electric motor.

36. A hydraulically actuated nestable valve in a sprinkler system responsive to computer control having an inlet and outlet comprising in combination:
a sprinkler;
a valve body having input through said inlet to a high pressure valve plenum within said body;
a valve seat defined within said body, said valve seat communicating to said high pressure valve plenum on one side, and having a passage to said valve outlet on the other side, said valve outlet connected to said sprinkler;
a valve disc for closing over said seat to contain said high pressure water plenum;
hydraulically actuated means including a passage to said high pressure plenum for movement under force to a normally closed position responsive to water pressure in said plenum;
a computer operatively connected to said hydraulically actuated means for controlling said hydraulically actuated means;
a pivot arm between said valve disc on one side and said hydraulically actuated means on the opposite side, with a pivot therebetween for taking said movement under force from said hydraulically actuated means and closing said valve; and
a passageway for bleeding pressure from said high pressure plenum from said hydraulically actuated means to release said force on said arm to permit said valve disc to rise, and open said valve seat to permit water flow from said plenum to said valve outlet.

37. A hydraulically actuated nestable valve according to claim 36 and including spring means communicated to said lever arm, to accommodate wear at said valve seat and valve disc.

38. A hydraulically actuated nestable valve according to claim 37 and including spring means between said valve disc and arm to accommodate wear at said seat and disc.

39. A hydraulically actuated nestable valve according to claim 36 and wherein said hydraulically actuated means includes a cylinder, a piston, and a rolling diaphragm connecting said cylinder and said piston.

40. A hydraulically actuated nestable valve according to claim 36 and wherein said lever arm connected said valve disc and hydraulically actuated means with leverage.

41. The invention of claim 40 in which said lever has leverage for multiplying force from said hydraulically actuated means onto said valve disc.

42. A hydraulically actuated nestable valve computer control and placement in nest relation with like valves, having an inlet and outlet, all said valves connected to a sprinkler system comprising in combination:
- a valve body having first and second parallel opposite walls;
- a high pressure valve plenum within said body, said plenum communicated to first aperture in said first wall and second apertures in said second wall, said apertures having common relative position to nest with like apertures in like walls;
- a valve seat defined within said body, said valve seat spanning a distance slightly less than the distance between said valve walls and communicated to said high pressure valve plenum on one side of said seat, and having a passage to said valve outlet on the other side of said seat, said passage being confined between said valve walls outward of said valve body;
- a sprinkler connected to each said valve outlet;
- a valve disc for disposing over said seat containing said high pressure water plenum;
- hydraulically actuated means including a passage to said high pressure plenum for movement under force to a normally closed position, responsive to water pressure in said plenum, said hydraulically actuated means being displaced from said valve seat and disc and nested between said first and second parallel opposite walls;
- a computer operatively connected to said hydraulically actuated means for actuating said means to control said valve disc;
- a pivot arm extending substantially parallel to said walls between said valve disc on one side, and said hydraulically actuated means on the opposite side, with a pivot therebetween for taking movement under force from said hydraulically actuated means, and closing said valve; and
- a passageway for bleeding pressure from said high pressure plenum from said hydraulically actuated means to release force on said arm, and to permit said valve disc to rise, and open said valve seat to permit water to flow from said plenum to said valve outlet, said passageway communicated away from said parallel walls of said valve body.

43. Generating apparatus for generating electricity placement across electrically actuated computer controlled sprinkler means for receiving and routing water to at least one sprinkling line and sprinkler comprising:
- first water passage means having an inlet for receiving water from a pressurized water source and selectably routing at least a portion of said pressurized water to an outlet and then to at least said first sprinkling line;
- water actuated rotatable means communicated to the outlet of said means for receiving water from said pressurized source;
- means for generating said electric energy to be used by said electrically actuated means for receiving and routing said water whereby said means for generating using a flow of water from said pressurized water source powers said means for receiving and routing, said means for generating having at least a first phase during which said means for generating is accelerating and a second phase during which said means for generating is rotating at a substantially constant means; and
- means for bypassing said means for receiving wherein said bypassing means provides a parallel flow path bypassing said water actuated rotable means during said second phase when said generating means is rotating at a substantially constant velocity whereby flow across said apparatus is increased between said pressurized water source and said at least one sprinkling line;
- a valve for controlling said at least one sprinkler responsive to a signal from a computer; and,
- a computer powered by said means for generating electricity operatively connected to said valve to operate said valve.

44. A computer actuated control means for direct overlying connection to a group of nested valves at an upper common surface formed in discrete segments by said nested valves, each said valve having:
- a common inlet for receiving fluid from a pressurized source;
- a discrete outlet for each said valve;
- a discrete segment for forming said upper common surface when said valves are nested;
- a hydraulic channel communicated through common locations on said discrete segment of said common surfaces of each said valve, said hydraulic channel communicated to hydraulic actuating means to cause fluid to flow between said inlet and outlet of said valve;
- valve nesting means for disposing said side-by-side valves to define said common surface with side-by-side discrete segments;
- computer controlled valve control means including:
- a valve matrix having a discrete valve for each said hydraulic channel to permit flow through said channel to actuate said valve;
- a computer actuated controlled for controlling said valve matrix to stop and start water to said hydraulic channel; and
- a channel matrix for disposition over said common surface defined by said discrete segments of said nested valves having a plurality of channels, each said channel including a common point of origin overlying the outlet of said channels on said discrete segment forming said common surface, and communicated to a discrete valve in said valve matrix at the other end, whereby said control can actuate any one of said group of nested valves.

* * * * *